(12) United States Patent
Miki et al.

(10) Patent No.: US 6,738,393 B2
(45) Date of Patent: May 18, 2004

(54) FRAME SYNCHRONIZATION CIRCUIT

(75) Inventors: Toshio Miki, Yokohama (JP); Sanae Hotani, Yokohama (JP)

(73) Assignee: NTT Mobile Communications, Tokyo (JP)

(*) Notice: Subject to any disclaimer, the term of this patent is extended or adjusted under 35 U.S.C. 154(b) by 0 days.

(21) Appl. No.: 09/171,216

(22) PCT Filed: Feb. 12, 1998

(86) PCT No.: PCT/JP98/00557
§ 371 (c)(1),
(2), (4) Date: Oct. 13, 1998

(87) PCT Pub. No.: WO98/36519
PCT Pub. Date: Aug. 20, 1998

(65) Prior Publication Data
US 2003/0189954 A1 Oct. 9, 2003

(30) Foreign Application Priority Data
Feb. 13, 1997 (JP) ............................................. 9-029411

(51) Int. Cl.⁷ .................................................. H04J 3/07
(52) U.S. Cl. ....................... 370/506; 370/503; 370/505; 370/509; 370/510; 370/470
(58) Field of Search ........................... 375/240, 27, 28; 370/468, 470, 474, 477, 503, 508, 509, 510, 511, 512–516

(56) References Cited
U.S. PATENT DOCUMENTS 4,943,985 A * 7/1990 Gherardi ...................... 375/362
5,390,199 A  2/1995 Ajima et al. ............... 371/67.1

(List continued on next page.)

FOREIGN PATENT DOCUMENTS

| JP | 62-053040 | * | 7/1987 | ............. H04L/7/02 |
| JP | 63-001128 | * | 6/1988 | ............. H04L/7/08 |
| JP | 1-251930 A | | 10/1989 | |
| JP | 8-139714 A | | 5/1996 | |
| JP | 08-139714 | * | 5/1996 | |

OTHER PUBLICATIONS

The Technical Report of IEICE, vol. 95, No. 581, Section 3.2.1, Bi–Directional Decoding and Reversible VLC (of Records).*

(List continued on next page.)

Primary Examiner—Douglas Olms
Assistant Examiner—Van Nguyen
(74) Attorney, Agent, or Firm—Brinks Hofer Gilson & Lione

(57) ABSTRACT

In a frame synchronization circuit, which prevents the occurrence of synchronous error due to a data loss/insertion while restraining a false synchronization/out of synchronization based on typical code error in a conventional data transmission system, the frame synchronization circuit is provided with a frame synchronization code detector which detects a frame synchronization code from a received data sequence to output a frame position and outputs a checked result by checking a frame synchronization code detected and a correct frame synchronization code. The frame synchronization circuit is also provided with and a data loss and data insertion period judgment circuit which determines which presumes whether a data loss or data insertion has occurred in the received data sequence according to the checked result.

12 Claims, 36 Drawing Sheets

U.S. PATENT DOCUMENTS

| | | | | |
|---|---|---|---|---|
| 5,481,572 A | * | 1/1996 | Skold et al. | 375/340 |
| 5,490,147 A | | 2/1996 | Kubo | 370/105.1 |
| 5,757,869 A | * | 5/1998 | Sands et al. | 370/506 |
| 5,790,588 A | * | 8/1998 | Fukawa et al. | 370/342 |
| 5,835,023 A | * | 11/1998 | Ito et al. | 340/7.35 |
| 5,838,791 A | * | 11/1998 | Torii et al. | 380/217 |
| 5,852,469 A | * | 12/1998 | Nagia et al. | 348/384 |
| 5,920,591 A | * | 7/1999 | Fukasawa et al. | 370/320 |
| 5,953,378 A | * | 9/1999 | Hotani et al. | 375/341 |
| 6,078,631 A | * | 6/2000 | Yabe et al. | 340/7.34 |
| 6,226,768 B1 | * | 5/2001 | Chujo et al. | 714/746 |

OTHER PUBLICATIONS

"A Study on Variable Length Frame Synchronization for MPEG–4 Audio", Sanae Hotani et al., IEICE Technical Report, vol. 96, No.481 (Jan. 23, 1997).

"Error Resilient Low–Bitrate Video Coding for MPEG4", Toshiaki Watanabe et al., IEICE Technical Report, vol. 95, No. 581 (Mar. 14, 1996).

* cited by examiner

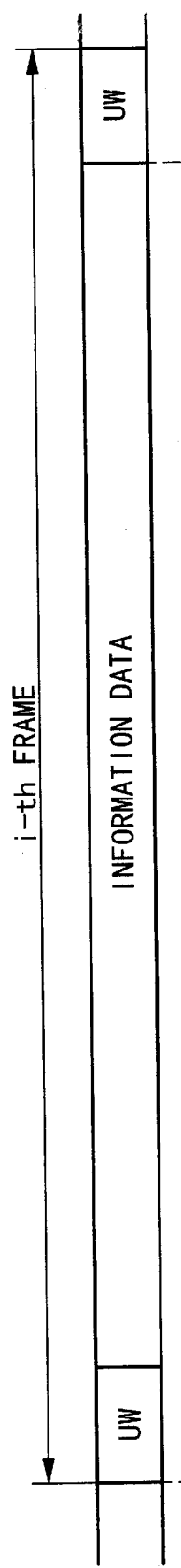
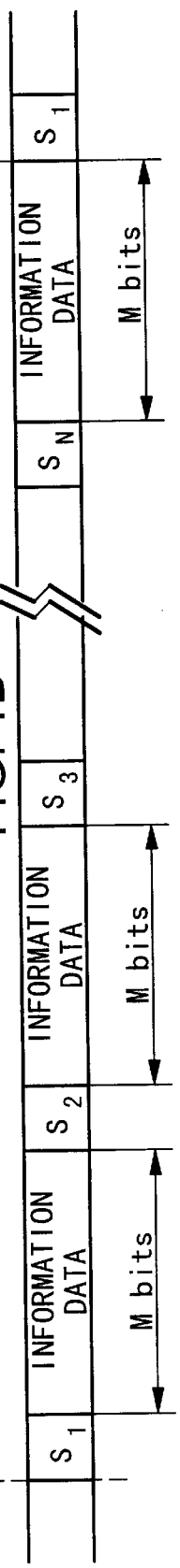
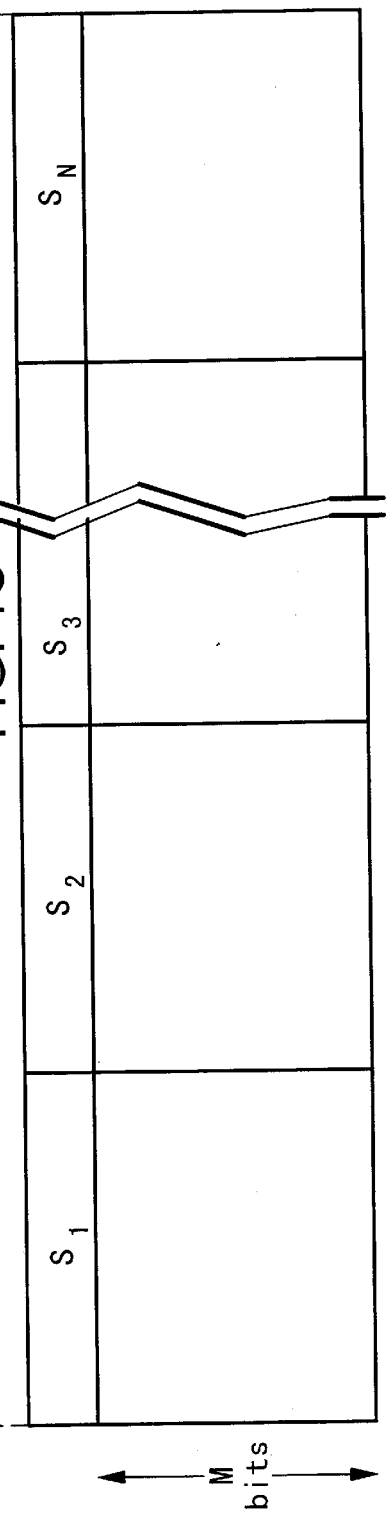
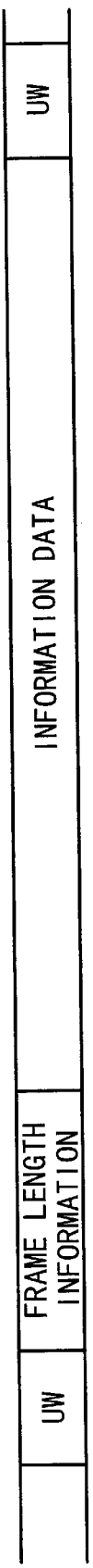

FIG. 7A RECEIVED DATA SEQUENCE WITHOUT CODE ERROR
FIG. 7B RECEIVED DATA SEQUENCE WITH CODE ERROR
FIG. 7C FIRST FRAME POSITION
FIG. 7D REFERENCE UNIQUE WORD (FORWARD DIRECTION)

FIG. 7E FIRST CHECKED RESULT
FIG. 7F SECOND FRAME POSITION
FIG. 7G REFERENCE UNIQUE WORD (BACKWARD DIRECTION)
FIG. 7H SECOND CHECKED RESULT

FIG. 10J
SECOND CHECKED RESULT EXAMPLE (1)

| 0 | 1 | 0 | 1 | 0 | 0 | 0 | 0 | 0 | 0 | 0 | 0 | 0 | 0 | 0 |

↑ 1,2
DATA LOSS PRESUMED POSITION

FIG. 10K
DUMMY DATA INSERTION EXAMPLE (1)

| $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | $S_{N-3}$ | $S_{N-2}$ | $S_{N-1}$ | $S_N$ | $S_1$ | $S_2$ |

FIG. 10L
FIRST CHECKED RESULT EXAMPLE (2)

| 0 | 0 | 0 | 0 | 0 | 1 | 0 | 1 | 1 | 0 | 1 | 0 | ? | ? | ? | ? | ? | ? |

FIG. 10M
SECOND CHECKED RESULT EXAMPLE (2)

| 0 | 1 | 0 | 1 | 0 | 0 | 0 | 0 | 0 | 0 | 0 | 0 | 0 | 0 | 0 |

RECEIVED DATA SEQUENCE WITHOUT CODE ERROR

RECEIVED DATA SEQUENCE WITH DATA LOSS

FIRST FRAME POSITION

REFERENCE UNIQUE WORD (FORWARD DIRECTION)

FIRST CHECKED RESULT

SECOND FRAME POSITION

REFERENCE UNIQUE WORD (BACKWARD DIRECTION)

SECOND CHECKED RESULT

FIRST CHECKED RESULT EXAMPLE (2)

LOSS OCCURRENCE POSITION (FOR FOUR BITS)

SECOND CHECKED RESULT EXAMPLE (2)

DUMMY DATA INSERTION EXAMPLE (2)

CORRECTED FRAME POSITION

CORRECTED FRAME POSITION

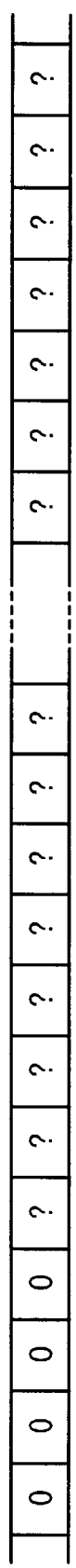
FIG. 13A RECEIVED DATA SEQUENCE WITHOUT CODE ERROR
FIG. 13B RECEIVED DATA SEQUENCE WITH CODE ERROR
FIG. 13C FIRST FRAME POSITION
FIG. 13D REFERENCE UNIQUE WORD (FORWARD DIRECTION)
FIG. 13E FIRST CHECKED RESULT

FIG. 13F
SECOND FRAME POSITION
FIG. 13G
REFERENCE UNIQUE WORD (BACKWARD DIRECTION)
FIG. 13H
SECOND CHECKED RESULT
DATA INSERTION OCCURRENCE POSITION
(FOR FOUR BITS)
FIG. 13I
FIRST CHECKED RESULT EXAMPLE (1)

FIG. 13J
SECOND CHECKED RESULT EXAMPLE (1)

| 0 | 1 | 0 | 0 | 1 | 0 | 1 | 1 | 0 | ... | 0 | 0 | 0 | 0 | 0 |

⇦ 1    ⇦ 2

DATA INSERTION PRESUMED POSITION

FIG. 13K
INSERTED DATA DELETION EXAMPLE (1)

| $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | ... | $S_N$ | $S_1$ | $S_2$ | $S_3$ | $S_4$ | $S_5$ | $S_6$ |

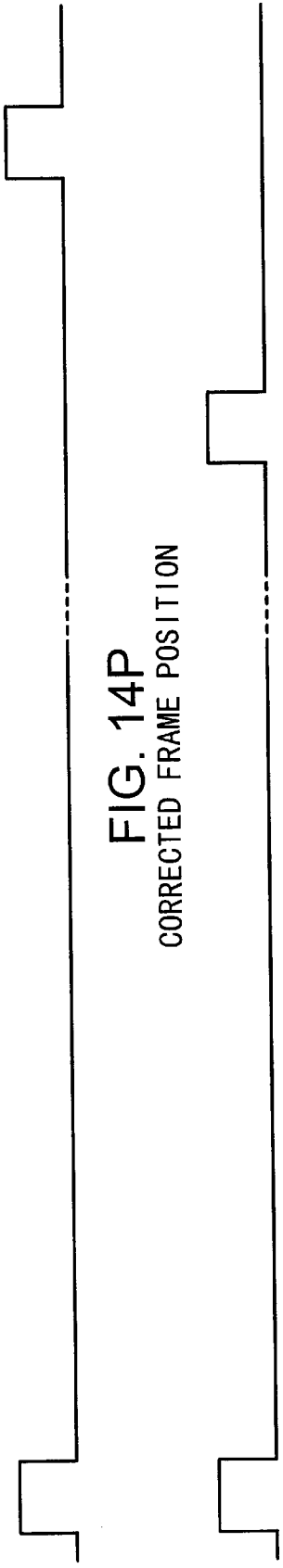
FIG. 14M SECOND CHECKED RESULT EXAMPLE (2)
FIG. 14N DUMMY DATA INSERTION EXAMPLE (2)
FIG. 14O CORRECTED FRAME POSITION
FIG. 14P CORRECTED FRAME POSITION

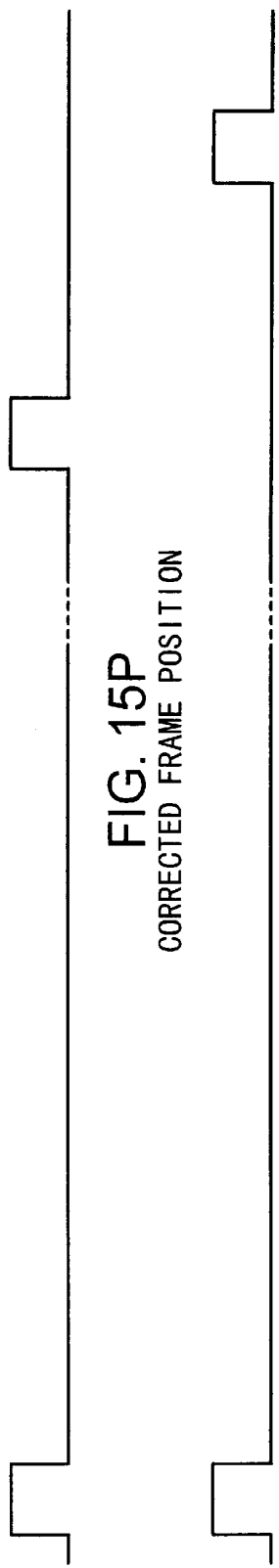

FIG. 16F SECOND FRAME POSITION
FIG. 16G REFERENCE UNIQUE WORD (BACKWARD DIRECTION)
FIG. 16H SECOND CHECKED RESULT
DATA INSERTION OCCURRENCE POSITION (FOR FOUR BITS)
FIG. 16I FIRST CHECKED RESULT EXAMPLE (1)

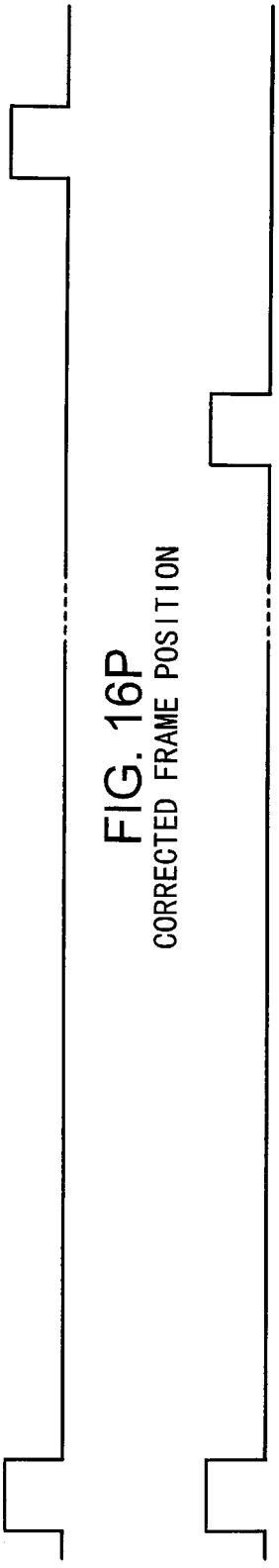

FIG. 20A RECEIVED DATA SEQUENCE WITHOUT CODE ERROR
FIG. 20B RECEIVED DATA SEQUENCE WITH CODE ERROR
FIG. 20C FRAME POSITION
FIG. 20D REFERENCE UNIQUE WORD

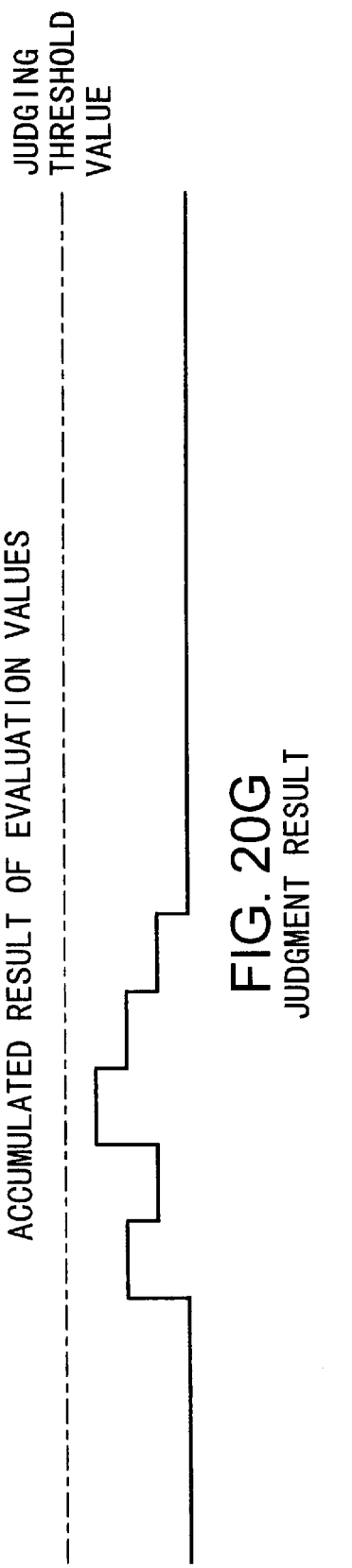

RECEIVED DATA SEQUENCE WITHOUT CODE ERROR

RECEIVED DATA SEQUENCE WITH DATA LOSS

FRAME POSITION

REFERENCE UNIQUE WORD

FRAME SYNCHRONIZATION CIRCUIT

FIELD OF THE INVENTION

The present invention relates to a frame synchronization circuit suitable to transmitting data sequence which have a frame composition in an environment where a code error, especially a data loss or data insertion in units of cells or packets, is likely to be generated.

BACKGROUND OF THE INVENTION

Conventionally, in a data transmission system in which information data to be transmitted is transmitted in frame units, a method for adding a unique word such as M sequence to each frame as a frame synchronization code has been widely used on its transmitting side. The position to which the unique word is added is not particularly defined in this method, but in general, the unique word is set to the head of a frame to simplify the composition, as shown in FIG. 1A. The unique word in the received data sequence is detected on the reception side, so that the frame position is identified to detect each frame and the transmitted information data is reproduced from each frame detected.

However, there is a disadvantage that an out of detection can occur. This is where detection of the unique word is prevented where the code error is likely to be generated. As such, there is proposed a technique in which the resistance to the burst code error is improved by positioning unique words scatteredly within a frame.

An example of a frame composition according to this technique is shown in FIGS. 1B and 1C. These figures show arrangements of identical unique words. FIG. 1C displays information data for every block of predetermined length (M+1 bits) and FIG. 1B expands the information data for every one bit. In FIG. 1C, unique words are constituted of the most significant bit (bits Sl to SN) of each block, and the signal shown in FIG. 1B can be obtained by expanding the unique words to serial data from high order bit sequentially.

In the example shown in FIG. 1B, the unique words Sj (j=1 to N) are assigned one bit to each uniform interval (M bits) in a transmission information data sequence. However, the intervals assigned may be nonuniform and also plural bits may be assigned. Incidentally, M and N are natural numbers.

Most of the unique words would survive even if a burst code error is generated in a transmission channel by positioning unique words scatteredly in this way, so that a failure to detect any of the unique words is avoided by permitting variations in of the number of constant bits at the time of detection, allowing detection of the unique words with high probability. Incidentally, If the variation in the number of bits is too large compared with the unique word length, false detection may occur, where part of the information data is detected by mistake as a unique word, so that the size of the allowable variation in bits and the unique word length must be set such that the probability of a false detection can be minimized.

Moreover, if a frame length is variable, to achieve higher frame synchronization property, frame length information can also be used in addition to the unique word as a frame synchronization code, as shown in FIG. 1D. An appearance position of the following frame synchronization code can be known on the reception side by using the frame length information, so that the probability of an out of detection or false detection of the frame synchronization code can be reduced compared to the case in which only the unique word is used.

Next, there are described the composition and operation of a conventional frame synchronization circuit. Incidentally, as a method for adding unique words to a frame, a head arrangement or scattered positioning described above can be considered, and there is no influence in the following explanation even if either is adopted.

A. In the Case of a Fixed Length Frame

FIG. 2 shows a composition of a conventional frame synchronization circuit (Example 1). The frame synchronization circuit shown in FIG. 2 may be utilized in a transmission system of a fixed length frame. As shown in FIG. 2, a received data sequence input from an input terminal 11 is sent to a unique word detector 12. In the unique word detector 12, an input buffer 15 buffers the received data sequence sent from the input terminal 11, cuts out data equivalent to the unique word length at every predetermined timing to supply the data to a comparator 16, and then shifts a cut out position of the data by one bit at every same timing.

The comparator 16 compares the data supplied from the input buffer 15 and the unique word sent from a unique word generator 17, and generates a "1" when the data is in accordance with the unique word or "0" when there is a variation. The single generated by comparator 16 is sent to a synchronization judgment circuit 13 as a comparison result. In order to prevent the out of detection based on code error occurring when comparison operation is performed in the comparator 16, the disagreement of the number of constant bits may be set so as to provide "agreement".

Next, the operation of the synchronization judgment circuit 13 will be described. FIG. 3 is a state transition chart of the synchronization judgment circuit 13. The synchronization judgment circuit 13 is, at first, in an out of synchronization state S1 in which frame synchronization is not established at all. The synchronization judgment circuit 13 in the out of synchronization state S1 transfers its own state to a backward 1 state S2 as "detection", when "1" is supplied from the comparator 16, and holds its own state in the out of synchronization state S1 as "out of detection", when "0" is supplied.

The synchronization judgment circuit 13 transferred to the backward 1 state S1 skips the received data sequence by the fixed frame length to wait for the output of the comparator 16. When the comparison result from the comparator 16 is "1", the synchronization judgment circuit 13 transfers its own state to a next backward 2 state S3 as "detection", and when it is "0", returns back to the out of synchronization state S1 as "out of detection". The processing similar to that described above is also performed in states after the backward 2, and the state of the synchronization judgment circuit 13 returns immediately back to the out of synchronization state S1 in the case of out of detection, and advances toward a synchronization establishment state S5 when "detection" continues for total of N+1 times.

Here, the states from the backward 1 to the backward N are set to reduce occurrence frequency of false synchronization, and generally, such setting is called "backward protection". When the backward protection is not set up, if the part which agrees with a unique word accidentally exists somewhere in the part other than a unique word in the received data sequence, a false detection which detects the unique word by mistake may occur, resulting in frequent false synchronization. However, the synchronization judgment circuit 13 illustrated in the present invention is provided with backward protection and also repeats agreement judgment for N+1 times to reduce the occurrence frequency of the false synchronization due to false detection.

Moreover, the synchronization judgment circuit 13, even when in the synchronization establishment state S5, skips the received data sequence only by the fixed frame length to wait for an output from the comparator 16. When "1" is supplied from the comparator 16, the synchronization judgment circuit 13 retains its own state in the synchronization establishment state S5 as "detection", and when "0" is supplied, transfers its own state to a forward 1 state S6 as "out of detection". The processes in the states from the forward 1 to a forward M are opposite those in the states from the backward 1 to the backward N described above, and in the case of "detection", the process returns immediately to the synchronization establishment state S5, and when "out of detection" continues for total of M+1 times, the process returns back to the out of synchronization state S1. Furthermore, the states from the forward 1 to the forward M are provided in order to avoid frequent occurrence of "synchronous error", and such setting is generally called "forward protection". When the forward protection is not provided, the synchronization may end immediately upon occurrence of the out of detection due to code error. However, the synchronization judgment circuit 13 illustrated in the example of the present invention is provided with the forward protection and repeats the agreement judgment for M+1 times to reduce the occurrence frequency of the "synchronous error".

B. In the Case of Variable Length Frame

In a transmission system of variable length frame, when only unique words are used as frame synchronization codes, the synchronization can also be established using a circuit of the similar composition as Example 1 shown in FIG. 2, except the function and operation of the synchronization judgment 13. However, in a data transmission system using the variable length frame, the appearance position of the following frame synchronization code can not be determined in advance on the reception side, so that the synchronization can not be established stably by performing the state transfer shown in FIG. 3, and the unique words have to be detected by shifting a received data sequence by one bit sequentially for all frames. For this reason, the trial frequency of the unique word detection will be increased, resulting in higher occurrence frequency of false detection. Therefore, in the example, the composition and operation of the frame synchronization circuit will be described in which not only the unique word but also the frame length information are used as the frame synchronization code.

FIG. 4 shows a composition of a conventional frame synchronization circuit (Example 2) using the unique word and frame length information as the frame synchronization code. In FIG. 4, the common parts to each part of FIG. 2 are identified by the same reference character and their explanations will be omitted. The differences between Example 2 shown in FIG. 4 and Example 1 shown in FIG. 2 are such that the synchronization judgment circuit 13 is replaced with a synchronization judgment circuit 13a and a frame length information detector 18 is newly provided.

The frame length information detector 18 extracts the frame length information followed by the unique word according to the received data sequence input from the input terminal 11 and a frame synchronization output supplied from the synchronization judgment circuit 13a to the output terminal 14, and supplies output data to the synchronization judgment circuit 13a after decoding is performed. Incidentally, when an error is contained in the frame length information, the synchronization judgment for the received data sequence, as will be described hereinafter, may be affected, so that the error correction and detection process (coding and decoding) is often provided to the frame length information in order to improve the reliability of the frame length information.

The synchronization judgment circuit 13a, presumes a position of the following frame synchronization code using the frame length information supplied from the frame length information detector 18 when detecting the frame synchronization code, and skips over the received data sequence to the presumed position concerned to wait for the output of the comparator 16. The operation except having described above is as similar to that of Example 1, therefore, the synchronization judgment according to the state transfer shown in FIG. 3 can be performed as with the fixed length frame, allowing the establishment of the stable synchronization.

Next, a conventional frame synchronization circuit (Example 3) will be explained in which the synchronization judgment is achieved without following the state transfer shown in FIG. 3. In the data transmission system using the variable length frame shown in FIG. 3, the unique word and frame length information are used as the frame synchronization codes, and the error correction and detection processes are premised to be applied to the frame length information. When the frame length information without error is detected in a position followed by the unique word, it is judged that a correct frame synchronization code has been detected. According to Example 3, the occurrence frequency of false detection can be reduced further than if only the unique word is used as the frame synchronization code, so that the frame synchronization position can be judged with high reliability without adopting the state transfer shown in FIG. 3.

As will be apparent from a manner described above, the conventional frame synchronization circuit for fixed and variable length frames operate effectively in either case for a typical code error, such as a random error and burst error, in a conventional transmission system.

However, a transmission system in which a new code error of a different type than that described above may be generated has appeared in recent years. For example, in an ATM (Asynchronous Transfer Mode) transmission, a data loss (cell loss) in packet units of 48 bytes to 53 bytes may occur, when a traffic is too large as compared with transmission channel capacity. Moreover, on an Internet, there has occurred the data loss with a packet unit longer than that described above. Furthermore, in a so-called multimedia transmission, coded data corresponding to plural display media are multiplexed, so that when a code error occurs in information indicating a multiplexed pattern, separating is performed using a wrong pattern, causing data loss or data insertion in packet units.

When a conventional frame synchronization circuit is applied to a data transmission system in which a code error of this type may occur, there appears a problem that the synchronization property is substantially degraded.

Here, there is shown an example of data loss/insertion in FIGS. 5A to 5D. As shown in FIGS. 5A to 5D, when a data loss (packet loss) occurs in a received data sequence FIG. 5A, the length of the frame in which data loss has occurred is made shorter than an original frame length 5B. And, when data insertion (packet insertion) has occurred in the received data sequence 5C, the length of the frame in which data insertion has occurred is made longer than the original frame length 5D.

When the data loss/insertion is generated while the frame synchronization circuit, (Example 1 and 2) as shown in the state transfer of FIG. 3 is in the synchronization establishment state, false frame synchronization positions are output continuously for the number of the frames which is "1" larger than the number of stages (M) of the forward protection, causing the continuous synchronous error. In addition, in order to recover the synchronization, the frame synchronization codes of the number, which adds 1 to the number of stages (N) of the backward protection must be detected continuously. That is, there is a disadvantage that the period of synchronous error is long.

Moreover, in order to reduce the time (number of frames) of the continuous synchronous error described above, a countermeasure of reducing the number of stages of the forward and backward protection can be considered. However, when this countermeasure is tried, a drawback will come out which can not maintain the strength to the typical code error, such as a random error or burst error, in a conventional transmission system. Notable, a counter measure without such a drawback is not presently known.

On the one hand, in the frame synchronization circuit (Example 3) which does not use the state transfer of FIG. 3 in a data transmission system using variable length frames, although the continuous synchronous error described above does not occur, frames which are shorter or longer than those expressed with the frame length information included in the frame synchronization code are received, so that the following frame synchronization position can not be detected correctly. Thus, the synchronization codes can not be detected in frames in which the data loss/insertion has occurred and in frames followed by the frames, resulting in synchronous error of at least two frames.

Furthermore, even when the following frame synchronization code can be detected correctly, only an alarm can be issued to indicate errors in the frame length of frames where the data loss/insertion has occurred, so that data with false length which includes discontinuity in the middle of a frame will be output. Therefore, there is a problem in which a decoder (corresponding to display media) followed by the frame synchronization circuit can not decode data from the frame synchronization circuit correctly. In addition, a decoder applied to a transmission channel where code error may exist is often provided with error protection functions, such as error correction function or bit interleave function, but when discontinuity exists in the middle of data supplied from the frame synchronization circuit or the length of a whole data is wrong, the above-mentioned function does not work at all.

SUMMARY OF THE INVENTION

The present invention has been made in an attempt to solve the above-described problems, and therefore, has a first object to provide a frame synchronization circuit which can prevent the occurrence of synchronous error due to data loss/insertion while restraining the false synchronization/out of synchronization according to the typical code error, such as random error and burst error, in a conventional transmission system.

It is a second object to provide a frame synchronization circuit which can reduce the adverse effect an a following circuit by correcting a received data sequence.

To solve the above described problem, in the present invention, a frame synchronization circuit used on a reception side in a data transmission system adopting a frame composition positioning a frame synchronization code scatteredly in a frame includes a frame.

synchronization code detector detecting a frame synchronization code from a received data sequence to output a frame position and a check result by checking a frame synchronization code detected and a correct frame synchronization code and a data loss and data insertion period judgment circuit determining whether a data loss or data insertion has occurred in said received data sequence according to said check result.

BRIEF DESCRIPTION OF THE DRAWINGS

FIGS. 1A to 1D are drawings showing the addition of the frame synchronization code.

FIGS. 7A to 7H are drawings extracting and showing only a portion of the frame synchronization code from the received data sequence shown in FIG. 6.

FIGS. 10A to 10M are drawings extracting and showing only a portion of the frame synchronization code from the received data sequence illustrated in FIG. 6.

FIGS. 13A to 13K are drawings extracting and showing only a portion of the frame synchronization code from the received data sequence illustrated in FIG. 6.

FIGS. 14A to 14H and 14L to 14P are drawings extracting and showing only a portion of the frame synchronization code from the received data sequence illustrated in FIG. 6.

FIGS. 15A to 15L and 15O to 15P are drawings extracting and showing only a portion of the frame synchronization code from the received data sequence illustrated in FIG. 6.

FIGS. 16A to 16L and 16O to 16P are drawings extracting and showing only a portion of the frame synchronization code from the received data sequence illustrated in FIG. 6.

FIGS. 20A to 20G are drawings explaining the operation of the embodiment in FIG. 19 when a code error has occurred.

FIGS. 21A to 21H are drawings explaining the operation of the embodiment in FIG. 19 when data loss has occurred.

THE BEST FORM FOR EXECUTING THE INVENTION

Principle of the Embodiment

Figure 2:
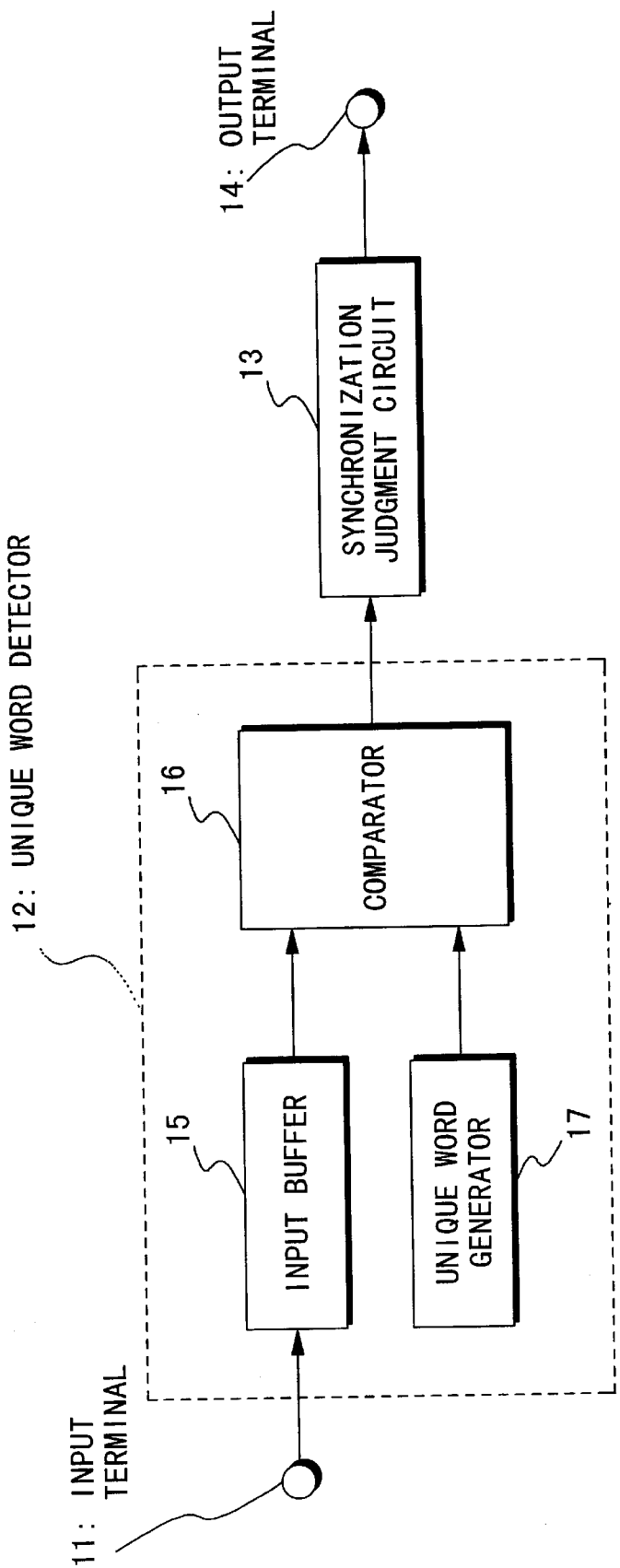
FIG. 2 is a block diagram showing a composition of a conventional frame synchronization circuit (Example 1).

When the data loss/insertion in packet units has occurred, a portion of a frame synchronization code along with the information data will be lost by using the frame composition positioning the frame synchronization code scatteredly in a frame.

When observing a frame synchronization code from both directions, in the forward direction (positive direction on time axis) and backward direction (opposite direction on time axis), in a received data sequence, there is a characteristic that when only a usual code error has occurred, the code error will be found in the same position, while a data loss/insertion has occurred in packet units, the code error will be found in the different position.

In addition, the position and the length of the lost frame synchronization code can be presumed from the position and the length where the disagreement has occurred. The position and the length of the lost information data can also be presumed using the presumed result of the position and the length of the lost frame synchronization code, so that the information data with correct length can be reproduced by inserting a dummy data into the period judged to be a data loss period and deleting the data concerned from the period judged to be the data insertion period.

As a result, the data loss in packet units can be transformed into a usual burst error, and the data insertion can be removed completely in an ideal case.

In a first preferred embodiment according to the above-mentioned facts and characteristics, a frame synchronization circuit used on the reception side of a data transmission system adopting a frame composition positioning a frame synchronization code scatteredly in a frame includes: a first frame synchronization code detector detecting a frame synchronization code by checking a received data sequence with a correct frame synchronization code in the forward direction on time axis to output the detected position as a first frame position and also outputting the checked result as a first checked result;

a second frame synchronization code detector detecting a frame synchronization code by checking said received data sequence with the correct frame synchronization code in the opposite direction on time axis to output a detected position as a second frame position and also outputting the checked result as a second checked result;

a difference circuit detecting a length from said first frame position to a second frame position immediately after the first frame position;

a frame length information output means outputting a frame length information;

a data loss and data insertion period judgment circuit determining a data loss period or data insertion period included in said received data sequence according to said frame length information, a length output from said difference circuit, said first checked result, and said second checked result; and a synchronization judgment circuit determining and outputting a frame synchronization position based on said first frame position, said second frame position, and the presumed result of said data loss and data insertion period judgment circuit.

In another embodiment, a dummy data insertion and deletion circuit is added to the above described composition which outputs a corrected received data sequence produced by inserting a dummy data into the presumed data loss period and deleting data from the presumed data insertion period for said received data sequence.

In yet another embodiment, said first frame synchronization code detector and said second frame synchronization code detector use frame synchronization positions output from said synchronization judgment circuit as initial values, when a data loss period or a data insertion period is presumed by said data loss and data insertion period judgment circuit.

In an alternative embodiment, in each composition described above, said data loss and data insertion period judgment circuit, when said frame length information of a frame to be processed is different from a length output from said difference circuit, determines provisionally that a data loss has occurred in the frame, (1) When a first start position, from which a check disagreement starts, followed by a continuous check agreement period which can be obtained from said first checked result viewed in the forward direction on time axis and is longer than a predetermined length agrees with a second start position, from which a check disagreement starts, followed by a continuous check agreement period which can be obtained from said second checked result viewed in the backward direction on time axis and is longer than predetermined length, it is finally judged that a data loss of a number of bits corresponding to a difference between said frame length information of a frame to be processed and a length output from said difference circuit has occurred at the position.

(2) When said second start position is prior to said first start position on time axis, it is finally judged that a data loss of said number of bits has occurred in any position in the period from said second start position to said first start position, In a case which is not applicable to either of (1) or (2), the provisional determination is changed such that not data loss but data insertion has occurred. (3) When a length of a period from said first start position to said second start position agrees with a length output from said difference circuit, the period is judged finally to be a data insertion period.

(4) When the length of a period from said first start position to said second start position is shorter than the length output from said difference circuit, the period of said number of bits including the period is judged finally to be a data insertion period.

Furthermore, in another embodiment, in addition to said (1) and (2), when said first start position is prior to said second start position on time axis, it is judged finally that a data loss of said number of bits has occurred in any position in the period from said first start position to said second start position, and only when a case is not applicable to this, the final judgment of said (3) or (4) is performed for the first time.

Furthermore, in another embodiment, a frame number is used together, and in addition to said (1) and (2), when said first start position is prior to said second start position on time axis and a frame number shown by said first frame position is continuous with an immediately following frame number shown by said second frame position, it is judged finally that a data loss of said number of bits has occurred in any position in the period from said first start position to said second start position, and only when a case does not correspond to this, a process is made to be advanced after said (3) for the first time, furthermore, in addition to said (3) and (4), when a length of a period from said first start position to said second start position is longer than a length output from said difference circuit, it is finally determined that data insertion of said number of bits has occurred in any position in the period.

Furthermore, in another embodiment, first and second threshold values are introduced, and when said frame length information of a frame to be processed is different from a length output from said difference circuit and the difference of both is shorter than a predetermined first threshold value, said data loss and data insertion period judgment circuit provisionally determines that a data loss has occurred in the frame, and in addition to said (1) and (2), when said first start position is prior to said second start position on time axis, it is finally determines that a data loss of said number of bits has occurred in any position in the period from said first start position to said second start position, when said frame length information of said frame is different from a length output from said difference circuit and also the length output from said difference circuit is shorter than a predetermined second threshold value, it is judged provisionally that a data insertion has occurred in the frame, and in addition to said (3) and (4), when a length of period from said first start position to said second start position is longer than a length output from said difference circuit, it is finally determined that a data insertion of said number of bits has occurred in any position in the period.

According to each embodiment described above, even if a data loss and data insertion in packet units may occur, a frame synchronous error does not come out and also the position and length of the data loss and data insertion can be presumed correctly. Moreover, an information data with correct length can be reproduced by inserting a dummy data into the period judged to be a data loss period and by deleting the data of the period concerned from the period determined to be a data insertion period. As a result, a data loss in packet units can be transformed into a burst error, and even if a data insertion may occur, the effect resulted from this can be removed completely in an ideal case. Also, when frame length information is included in a frame synchronization code or a unique word is set properly, this embodiment can be applied not only to a fixed length frame but also to a variable length frame. Of course, there is no limitation for the position and length of data loss/insertion which can be presumed and compensated.

The First Embodiment

Figure 8:
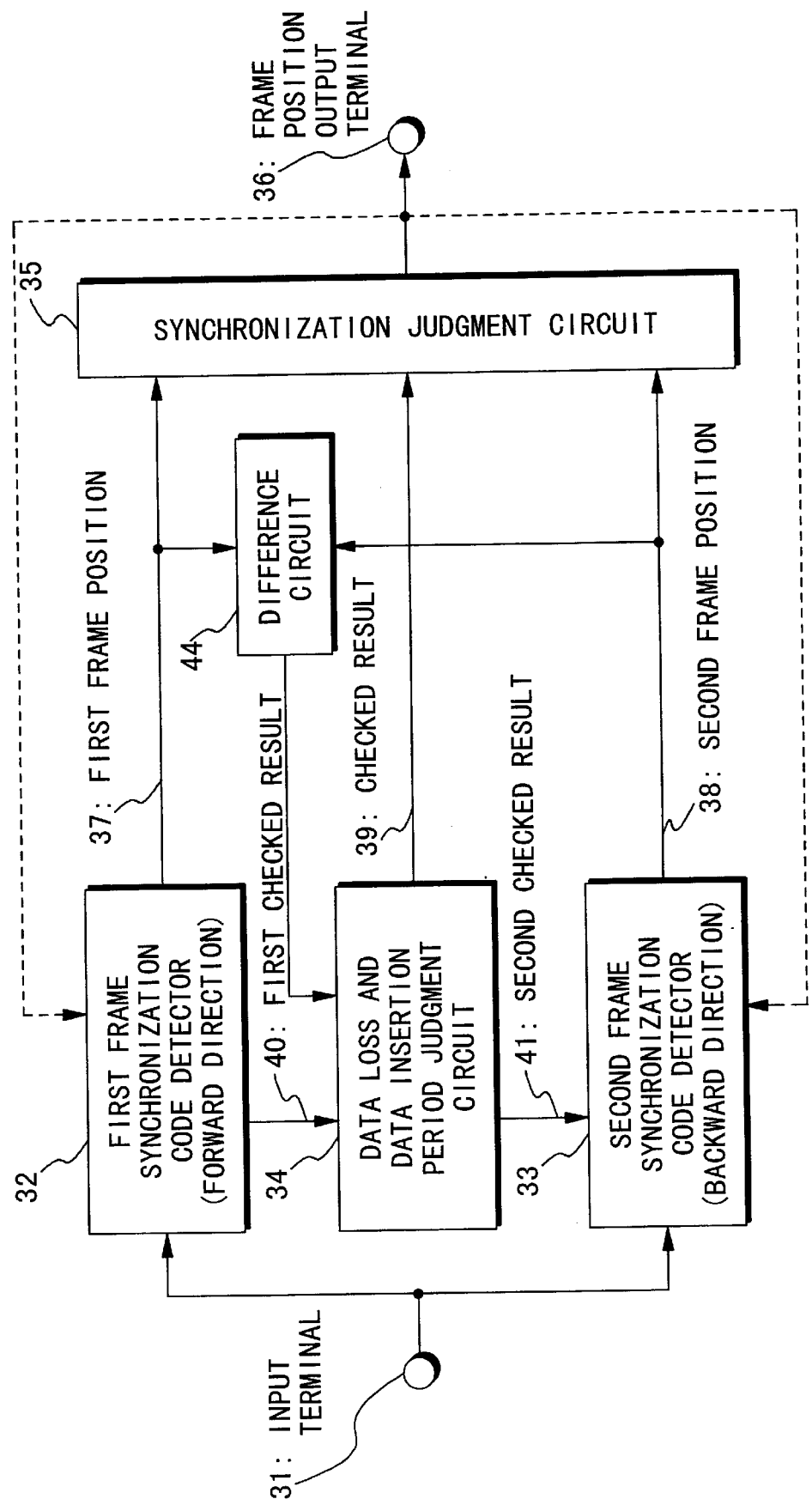
FIG. 8 is a block diagram showing a composition (composition 1) of a frame synchronization circuit according to an embodiment of the present invention.

FIG. 8 is a block diagram showing a composition (Composition 1) of a frame synchronization circuit according to an embodiment of the present invention. In this drawing, 31 is an input terminal into which a received data sequence is input, 32 is a first synchronization code detector which checks the received data sequence input from the input terminal 31 and a unique word produced inside of the frame synchronization circuit on time axis in the forward direction and outputs a first checked result 40 and a first frame position 37 which is a synchronization position candidate based on the checked result concerned. Symbol 33 designates a second synchronization code detector which checks the received data sequence input from the input terminal 31 and a unique word produced inside of the frame synchronization circuit on time axis in the backward direction and outputs a second checked result 41 and a second frame position 38 which is a synchronization position candidate based on the checked result concerned. Incidentally, checking on time axis in the forward direction is referred to as a processing which views the received data sequence in the order of reception and also views the reference unique word in the order corresponding to this sequence to compare for every corresponding bit. And, checking on time axis in the backward direction is referred to as a processing which views the received data sequence in the opposite order of reception and also views the reference unique word in the order corresponding to this opposite sequence to compare for every corresponding bit.

Symbol 44 designates a difference circuit which outputs the difference between the first frame position 37 and the second frame position 38, and 34 is a data loss and data insertion period judgment circuit which presumes a data loss/insertion period according to the first checked result 40, the second frame position 38, and the output of the difference circuit 44 and outputs the determined period as a judgment result 39. 35 is a synchronization judgment circuit which decides a frame synchronization position based on the first frame position 37, the second frame position 38, and the judgment result 39 to output it to a frame position output terminal 36. Incidentally, the presumption process of a data loss/insertion period and the decision process of the frame synchronization position, including an explanation of the operation, will be described later.

Figure 9:
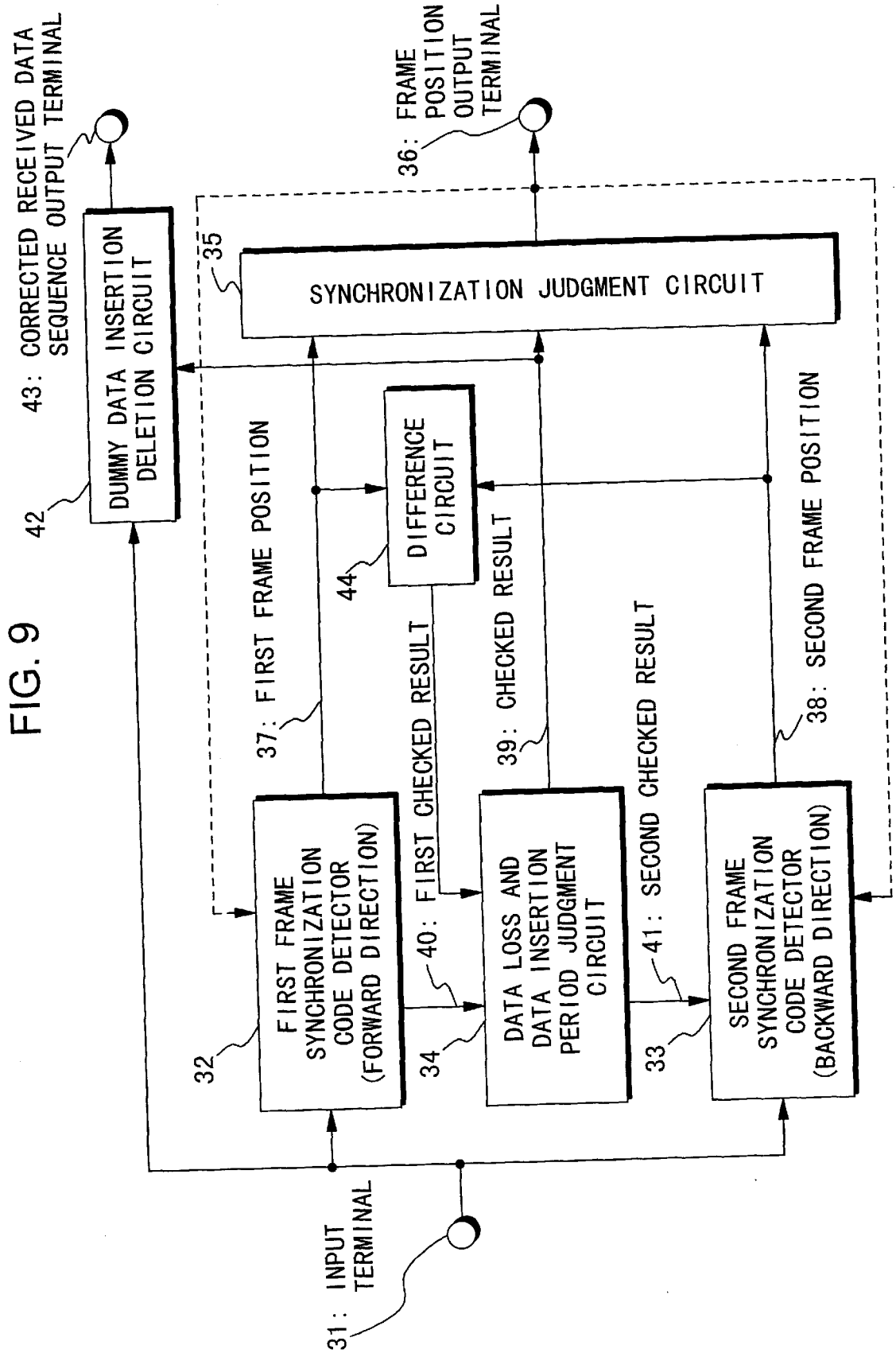
FIG. 9 is a block diagram showing a composition (composition 2) of a modification of a frame synchronization circuit according to an embodiment of the present invention.

FIG. 9 is a block diagram showing a composition (Composition 2) of a modification of a frame synchronization circuit according to another embodiment of the present invention. What is greatly different between the frame synchronization circuit shown in this Figure and the one shown in FIG. 8 is to provide a dummy data insertion and deletion circuit 42.

The dummy data insertion and deletion circuit 42 corrects the received data sequence input from the input terminal 31 according to the output from the data loss and data insertion period judgment circuit 34 and outputs the (corrected received data sequence) through a corrected received data sequence output terminal 43. The concrete correction processing will be described hereinafter in an explanation of the operation.

A-3. Composition where Broken Line Parts Are Added to FIGS. 8 and 9

In addition, compositions (Compositions 3, 4) of modification of each frame synchronization circuit are shown in FIGS. 8 and 9 by expressing additional portions with broken lines.

Figure 3:
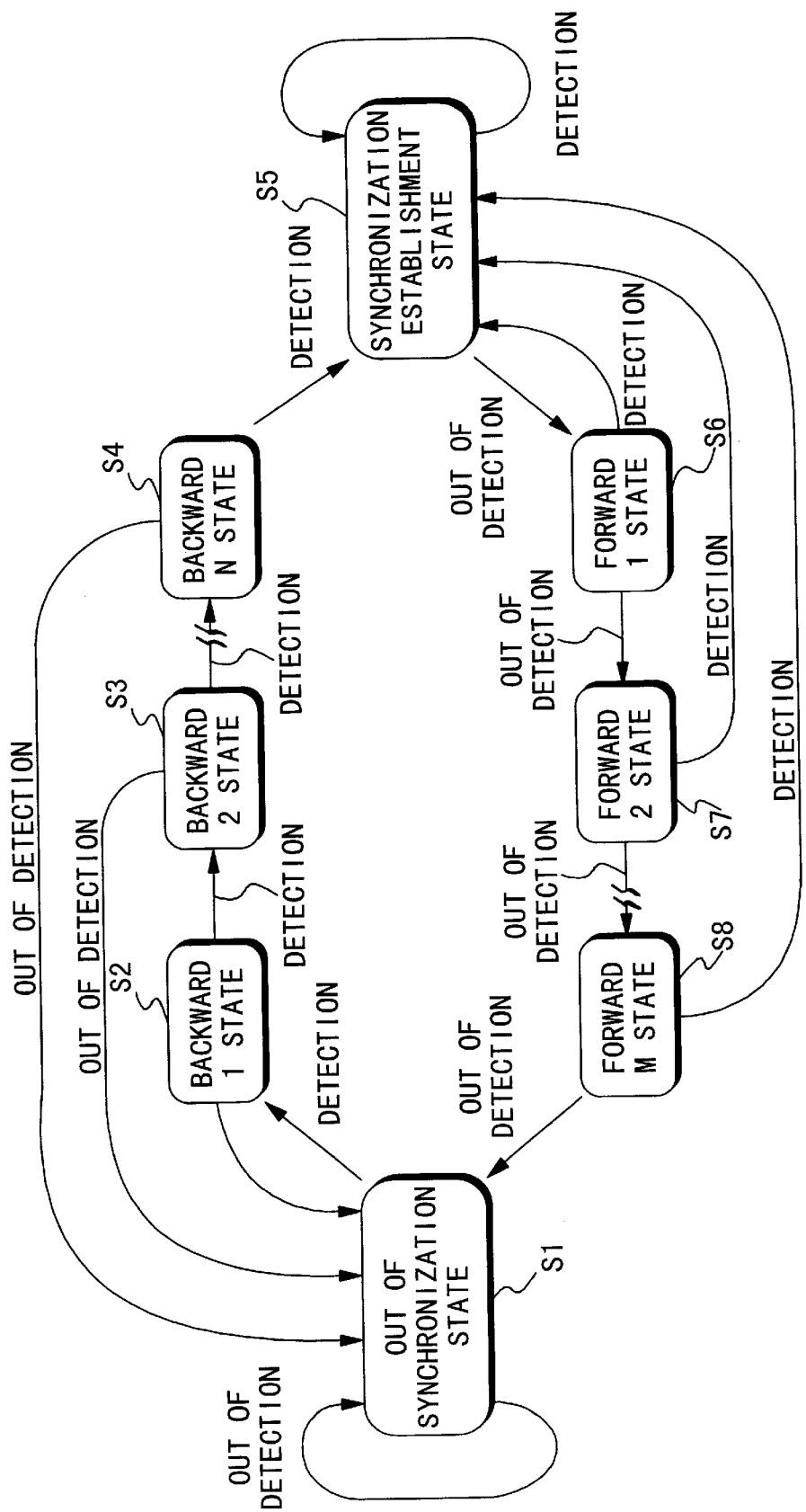
FIG. 3 is a state transfer chart of a synchronization judgment circuit 13 from Example 1.
Figure 4:
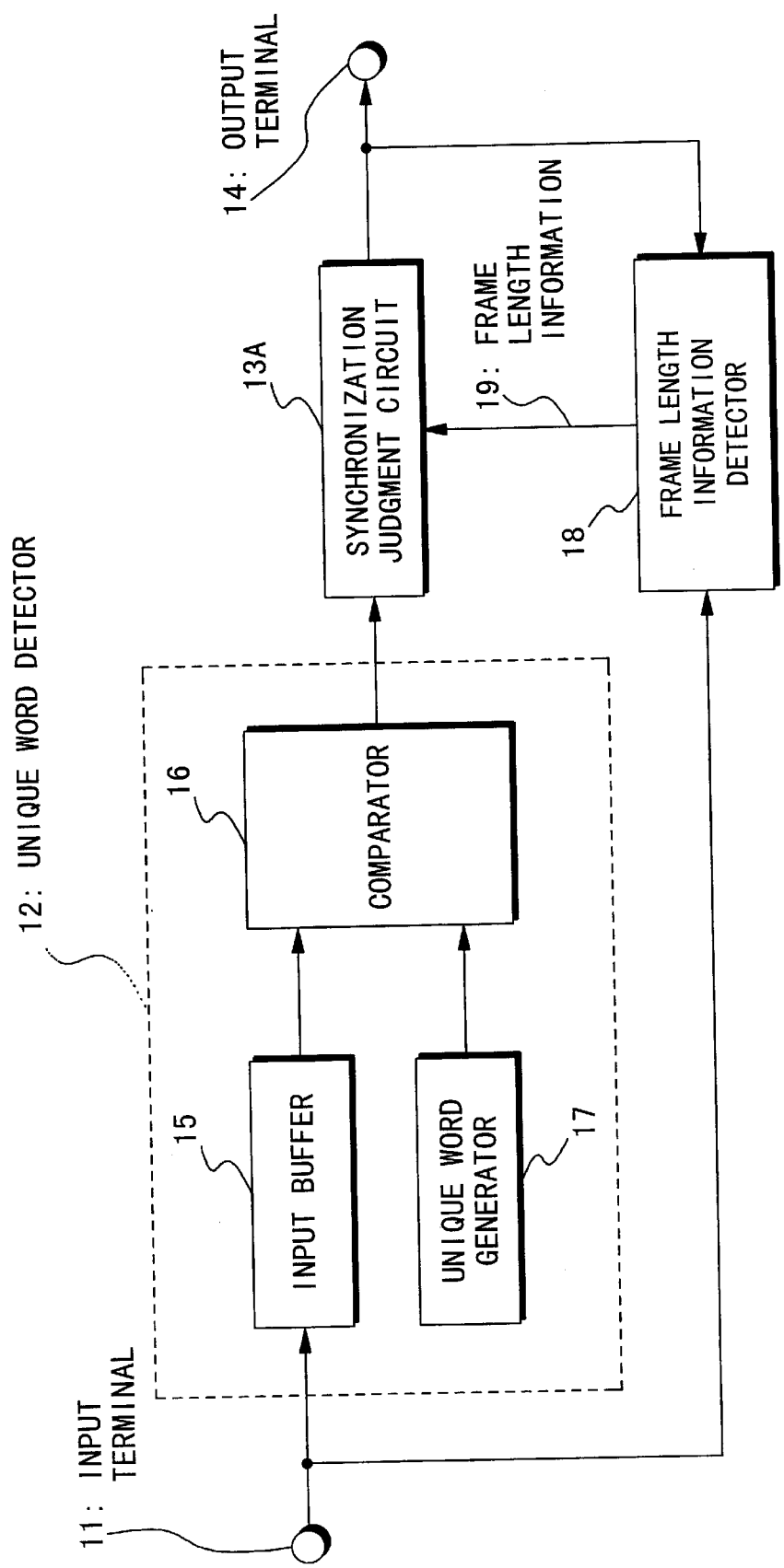
FIG. 4 is a block diagram showing a composition of a conventional frame synchronization circuit (Example 2).
Figure 5A:
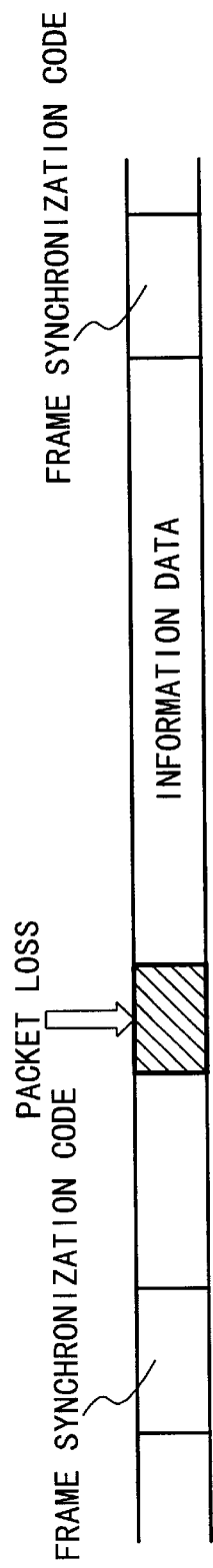
FIGS. 5A to 5D are drawings showing one example of a received data sequence in which data loss and data insertion have occurred.
Figure 5B:
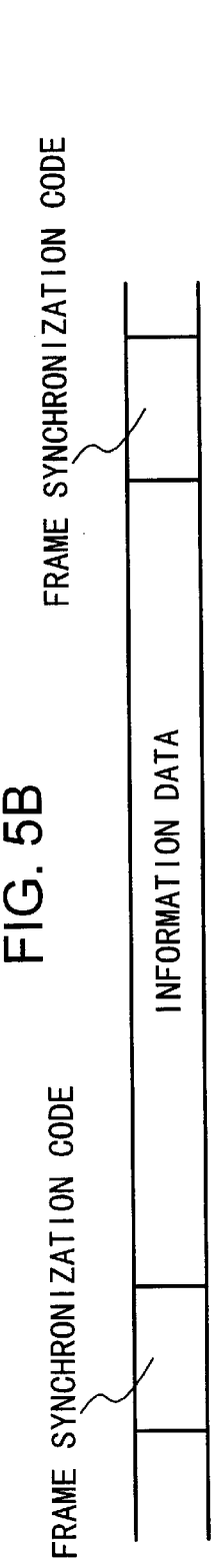
Figure 5C:
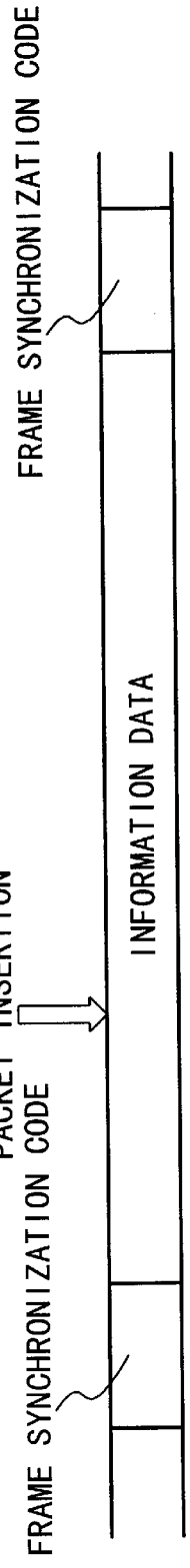
Figure 5D:
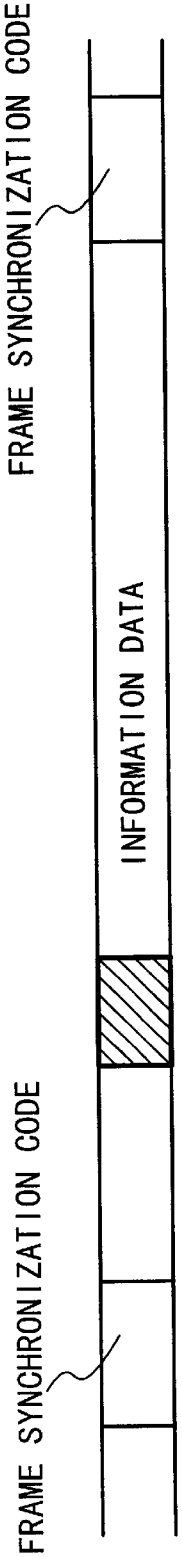

Incidentally, the state transfer of FIG. 3 is adopted in either composition described above.

B. Composition of the Transmission Data

Figure 6:
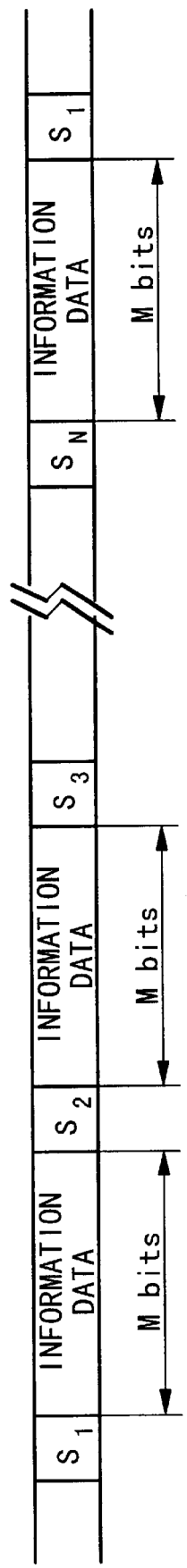
FIG. 6 is a schematic view showing one example of the received data sequence according to one embodiment of the present invention.

FIG. 6 is a schematic view showing one example of the received data sequence of this embodiment according to the present invention. As shown in this figure, a frame synchronization code is positioned in a frame scatteredly in the present invention. In order to avoid the explanation to be complicated in this embodiment, a frame length is defined as a fixed length, a frame synchronization code is made a unique word such as M sequence, and a method for scattered positioning is an equal interval positioning of single bits (total of N bits) at intervals of M bits. Therefore, the frame length becomes N×(M+1) bits and the information data length becomes N×M bits. Incidentally, N and M are natural numbers.

FIG. 6 illustrates the composition of the i-th frame (i is a natural number) of a received data sequence. At the head of a frame, the first bit S1 of a frame synchronization code is arranged, subsequently M-bit information data, the second bit S2, M-bit information data, . . . , the N-th bit SN, and M-bit information data are arranged. Furthermore, even when the length of the last information data block is changed in the range of 1–M bits, the frame synchronization is not affected, so that a fixed length frame of arbitrary length can actually be processed.

C. Operation when Usual Code Error Has Occurred

Next, The operation according to the present embodiment will be described when a usual code error such as a random error occur and burst error in a conventional data transmission system.

FIGS. 7A to 7H shows only a part of frame synchronization code extracted from a received data sequence illustrated in FIG. 6. There are shown with corresponded bit position a received data sequence without code error FIG. 7A, a received data sequence in which code errors have occurred in positions marked "x" in the figure, frame positions (first frame positions) FIG. 7C obtained when frame synchronization is performed in the forward direction on time axis to the received data sequence FIG. 7B, reference unique words FIG. 7D in the forward direction on time axis, a checked result (a first checked result) FIG. 7E between the received data sequence FIG. 7B and the reference unique words in the forward direction, frame positions (second frame positions) FIG. 7F obtained when frame synchronization is performed in the backward direction on time axis to the received data sequence FIG. 7B, reference unique words FIG. 7G in the opposite direction on time axis, and a checked result (a second checked result) FIG. 7H between the received data sequence FIG. 7B and the reference unique words in the backward direction. In the example shown in this figure, the code errors have occurred at the fourth bit S4 and sixth bit S6.

As shown in FIGS. 7A to 7H, when a usual code error has occurred, the first frame positions obtained by frame synchronization detection in the forward direction on time axis agrees with the second frame positions obtained by frame synchronization detection in the backward direction on time axis, and both designates the normal positions. Therefore, the output of the difference circuit 44 agrees with the length of the frame to be detected. However, the first frame position shows the head position of the frame to be processed (detected) and the second frame position indicates the head position of the immediately following frame of the frame concerned. Also, in the first checked result FIG. 7E and second checked result 7H, plural of "1" indicating the disagreement of check occur in the fourth bit S4 and sixth bit S6, but the both checked results are agreed completely.

As mentioned above, when two properties, that is, (1) the output of the difference circuit 44 agrees with the length of the frame to be detected, and (2) the first checked result agrees with the second checked result, are adapted, it can interpret that usual code errors, such as a random error and burst error, may occur, so that the data loss and data insertion period judgment circuit 34 does not output any data to the synchronization judgment circuit 35. Therefore, the synchronization judgment circuit 35 outputs the first frame position or second frame position to the frame position output terminal 36 as a correct frame synchronization position (It depends on design of the circuit which of the first frame position or second frame position is output).

As described above, when a usual code error may occur, the frame synchronization circuit according to the present embodiment operates like a conventional frame synchronization circuit. Of course, the same is true of the case without code error. In addition, the similar operation is also performed in the above described Composition 2 to 4. Incidentally, the dummy data insertion and deletion circuit 42 makes the received data sequence pass through to the corrected received data sequence output terminal 43. Moreover, in Composition 3 and 4, because the data loss and data insertion period judgment circuit 34 outputs nothing, the first frame synchronization code detector 32 and second frame synchronization code detector are not initialized.

D. Operation when Only Data Loss Occurs

Next, the operation according to the present embodiment will be described when only data loss in packet units occurs (when code error other than data loss does not occur). However, to avoid the explanation to become complicated, the data loss is defined to occur at the intervals of multiple of the positioning period of the unique word. Also, in this section, after describing the process in Composition 2 previously noted, the process in Composition 1 will be described.

FIGS. 10A to 10M shows only a portion of a frame synchronization code extracted from the received data sequence illustrated in FIG. 6. There are shown in the upper part of the figure a received data sequence FIG. 10A without code error, a received data sequence FIG. 10B in which data loss has occurred in a frame, the first frame position FIG. 10C in the forward direction to the received data sequence FIG. 10B, reference unique words FIG. 10D in the forward direction on time axis, the first checked result FIG. 10E in the forward direction to the received data sequence FIG. 10B, the second frame position FIG. 10F in the backward direction to the received data sequence FIG. 10B, reference unique words FIG. 10G in the backward direction on time axis, and the second checked result FIG. 10H in the backward direction to the received data sequence FIG. 10B. In the example shown in this embodiment, as is evident from the received data sequence FIG. 10B, four bits from the fifth bit S5 to eighth bit S8 are lost due to data loss.

When such data sequence FIG. 10B is input from the input terminal 31, the received data sequence concerned is supplied to the first frame synchronization code detector 32 and the second frame synchronization code detector 33.

Figure 12:
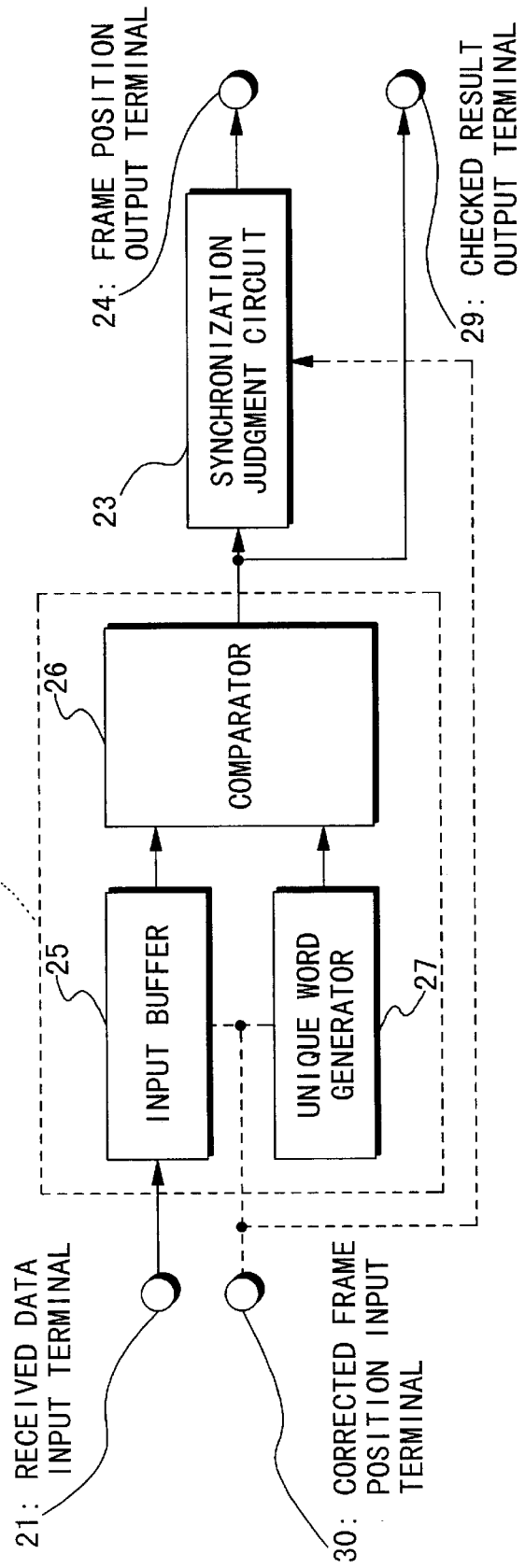
FIG. 12 is a block diagram showing an example of internal composition (example of internal composition 1) of each frame synchronization code detector.

Here, an inner composition example (Inner composition example 1) of each frame synchronization code detector is shown in FIG. 12. The inner composition example 1 shown in this figure is composed of a reception data input terminal 21, a unique word detector 22 which compares the received data sequence from the reception data input terminal 21 and the reference unique word to output the compared result, a synchronization judgment circuit 23 which detects a frame position based on the compared result concerned, a frame position output terminal 24 which outputs the detected frame position, and a checked result output terminal 29 which outputs the compared result of the unique word detector 22.

The unique word detector 22 is provided with an input buffer 25 which buffers a received data sequence from the reception data input terminal 21 to output a candidate of unique data, a unique word generator 27 which generates a reference unique word, and a comparator 26 which compares both to output a compared result (for example, exclusive OR). The input buffer 25 cuts out data equal to the unique word length from the data buffered at every predetermined timing to supply it to the comparator 26 and also shifts a cutting out position of data by one bit sequentially at every same timing. Incidentally, the data output sequence (bit output sequence) from the input buffer 25 and the unique word generator 27 is in the forward direction on time axis (FIFO) in the first frame synchronization code detector or in the opposite direction on time axis (LIFO) in the second frame synchronization code detector, so that it is necessary to adopt a different composition for each unique word generator, but to avoid the explanation to become complicated in this embodiment, the composition shown in FIG. 12 is made a representative example. Also, in FIGS. 10A to 10M, in order to make the comparison of each data comprehensible, the data in the opposite direction on time axis is transformed into data in the forward direction on time axis.

The first frame synchronization code detector 32 of the above mentioned composition detects the frame synchronization code from the received as shown in FIG. 9 data sequence supplied in the forward direction on time axis to output the first frame position 37 shown in FIG. 10C. On the one hand, in synchronization established state, the unique word generator 27 inside of the first frame synchronization code detector 32 generates the reference unique word in the forward direction shown in FIG. 10D, and the first checked result 40 shown in FIG. 10E is generated by checking the reference unique word and the received data sequence.

In the example of FIG. 10, four bits from the fifth bit S5 to the eighth bit S8 are lost because of data loss, but code error other than data loss has not occurred, thereby the first checked result FIG. 10E from the first bit S1 to the fourth bit S4 is set "0" correctly. However, beyond the fourth bit, when the j-th bit Sj agrees with the (j−4)th bit Sj−4 (9<=j<=N), the checked result becomes "0", and when they are in disagreement, it becomes "1", so that bits beyond the fourth bit are expressed by "?" in the figure which indicates indetermination.

On the other hand, the second frame synchronization code detector 33 performs the similar operation as the first frame synchronization code detector 32 described above except detecting the frame synchronization code in the opposite direction on time axis. Therefore, the second frame position 38, the reference unique word in the opposite direction, and the second checked result 41, as shown in FIGS. 10F to 10H, can be obtained. In the example in FIG. 10, code error other than data loss has not occurred, thereby the second checked result FIG. 10H from the N-th bit SN to the ninth bit S9 is set "0" correctly, but before the ninth bit when the j-th bit Sj agrees with the (j−4)th bit Sj−4 (5<=j<=8), the second checked result becomes "0", and when they are in disagreement, it becomes "1", so that bits before the ninth bit are expressed by "?". And, in the difference circuit 44, the difference between the first frame position 37 and the immediately following second frame position 38 is determined to supply it to the data loss and data insertion period judgment circuit 34. In the example of FIG. 10, because there is a difference of N−4 bits, the data loss and data insertion period judgment circuit 34 provisionally determines that the data loss has occurred.

Generally, M sequence with low autocorrelation or the like is used for a unique word, so that it is rare that the comparison result between the j-th bit Sj and the (j−4)-th bit Sj−4 becomes "in agreement" continuously. That is, it is rare that the first checked result 40 after a data loss occurrence position is set to "0" continuously and the second checked result 41 before the data loss occurrence position is also set "0" continuously. On the other hand, as will be apparent from the foregoing description, the first checked result 40 before the data loss occurrence position and the second checked result 41 after the data loss occurrence position are surely set to "0" when there is no code errors other than data loss. The present embodiment, using such a characteristic, presumes the data loss occurrence position by using a boundary point at which the first and second checked results become "in disagreement".

The point at which the checked result becomes "1" for the first time beyond the data loss occurrence position changes depending on the autocorrelation of a unique word, so that various situations as described below are considered.

A first checked result example (1) shown in FIG. 10I and a second checked result example (1) shown in FIG. 10J are obtained by assuming that S4 is not equal to S8 and S5 is not equal to S9, and the first start position (immediately after the fourth bit S4) from which there starts a check disagreement subsequent to a check agreement period longer than a predetermined length viewed the first checked result example (1) in the forward direction on time axis agrees with the second start position (immediately before the ninth bit S9) from which there starts a check disagreement subsequent to a check agreement period longer than a predetermined length viewed the second checked result example (1) in the backward direction on time axis. Therefore, it can judge finally that a data loss of a presumed loss length (four bits in this case) has occurred at the position from the fifth bit S5 to the eighth bit S8, that is, at the position between the fourth bit S4 and the fifth bit S5 in the received data sequence of FIG. 10B. Incidentally, the presumed loss length can be obtained by calculating the difference between the frame length information (N) and the output (N−4) of the difference circuit 44.

By the way, because the presumed loss length is 4 bits and the presumed loss position is in the position from the fifth bit S5 to the eighth bit S8, as shown by hatching in FIG. 10K, the received data sequence with correct length can be reproduced by inserting the lost frame synchronization code and/or information data to the period equal to four bits from the fifth bit S5 to the eighth bit S8. However, it is actually impossible to reproduce the contents of the lost information data correctly on the reception side, so that in the present embodiment, when the lost data are information data, dummy data with the same length as that of the lost data are inserted into the period concerned. The processing of inserting the lost frame synchronization code and/or dummy data is performed by a dummy data insertion and deletion circuit 42 in Composition 2 and 4 (refer to FIG. 9).

Next, an example according to a different embodiment will be explained.

FIGS. 11A to 11H and 11L to 11M show only a part of the frame synchronization code extracted from the received data sequence illustrated in FIG. 6, and FIGS. 11A to 11H identical with those of FIGS. 10A to 10M are shown in the upper part of FIGS. 11A to 11H and 11L to 11P. However, FIGS. 11L to 11P are shown in the lower part of the figure in place of FIGS. 10I to 10K. In a first checked result example (2) of FIG. 11L and a second checked result example (2) of FIG. 11M, it is assumed that S4 equals to S8, S5 equals to S9, S3 does not equal to S7, and S6 does not equal to S10, and when viewing in the respective directions on time axis, both of the first start position and the second start position described above exceed the actual data loss positions by one bit, so that the position between the position immediately after the fifth bit S5 and the one immediately before the fourth bit S4 is judged as a presumption loss position. That is, the ambiguity equivalent to two bits occurs in the presumption loss position.

Thus, when the second start position is prior to the first start position on time axis, there is no choice but to judge finally that the data loss of four bits has occurred in the period from the second start position to the first start position. That is, one of three presumptions of (1) S4 to S7, (2) S5 to S8, and (3) S6 to S9 may be the correct data loss period, but sufficient information has not been obtained to establish one of the three presumptions. When inserting dummy data in such a case, it is safety to process the data loss period as longer period by number of bits corresponding to the degree of above mentioned ambiguity compared with the presumed loss length. In the example of FIGS. 11A to 11H and 11L to 11M, the presumed loss length is four bits and the presumed loss position is immediately after one of the third bit S3, the fourth bit S4, and the fifth bit S5, so that the received data sequence with correct length is reproduced by inserting the lost frame synchronization code and/or dummy data into the period equal to six bits from the fourth bit S4 to the ninth bit S9, as shown by hatching in FIG. 11N.

As described above, the position at which the checked result becomes "1" for the first time beyond the actual data loss occurrence position changes depending on the autocorrelation of unique word. As with many M sequence, when the autocorrelation of unique word is assumed to be "0", the probability in which the first start position described above agrees with the second start position becomes 25%. In addition, the probability in which ambiguity of several bits may occur is as follows;

(1) one bit: 25%,
(2) two bits: 18.75%, and
(3) three bits: 12.5%.

Therefore, when the ambiguity of three bits or less is made permissible, the data loss period can be presumed with the probability of 80% or more.

Figures 11A, 11B, 11C, 11D, 11E:
FIGS. 11A to 11H and 11L to 11P are drawings extracting and showing only a portion of the frame synchronization code from the received data sequence illustrated in FIG. 6.
Figures 11F, 11G, 11H, 11L:
Figures 11M, 11N, 11O, 11P:
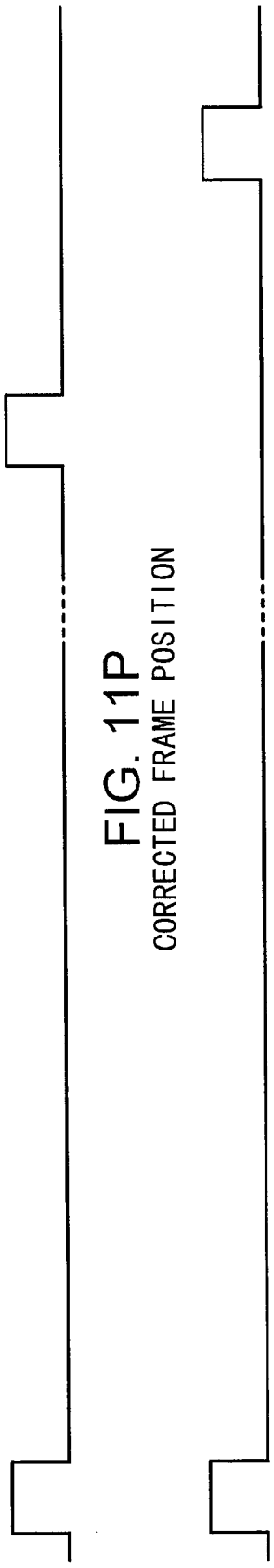

Because Composition 1 is not provided with the data insertion and deletion circuit, even when a data loss period is turned out, it does not operate the received data. Therefore, it only outputs alarm of data loss or informs a data loss period to a subsequent circuit (for example, a decoder corresponding to media coding). However, the first frame position is right as the frame position before data loss and the second frame position is right as the frame position after data loss, so that the frame synchronization position outputted has to be corrected from the first frame position to the second frame position in the synchronization judgment circuit 35. The example of output result of the frame synchronization position in this case is shown in FIG. 11O.

By the way, in order to make the operation continue quickly in the subsequent frame, it is necessary to correct the reference unique word and first frame position, which are an internal state (internal data) of the first frame synchronization code detector 32, for its purpose, it is very effective to initialize the internal state of the first frame synchronization code detector 32 according to an output result of the synchronization judgment circuit 35 as shown in Composition 3.

On the other hand, Composition 2 is provided with the data insertion and deletion circuit 42, so that the received data sequence with correct length (corrected received data sequence) can be reproduced by inserting dummy data described above. Therefore, the synchronization judgment circuit 35 always outputs the first frame position as the correct frame position. The example of the output result of the frame synchronization position is shown in FIG. 10P. In this case, in order to make the operation continue quickly in the subsequent frame, it is necessary to correct the reference unique word and second frame position, which are an internal state of the second frame synchronization code detector, for its purpose, it is very effective to initialize the internal state of the second frame synchronization code detector 33 according to an output result of the synchronization judgment circuit 35 as shown in Composition 4.

Incidentally, when applying to neither of the following conditions, the provisional judgment result is changed with the understanding that not the data loss but data insertion, as will hereinbelow be described, has occurred to perform the operation corresponding to data insertion;

(3) the first start position agrees with the second start position, and
(4) the second start position is prior to the first start position on time axis.

Operation when Only Data Insertion Occurs

Next, the operation of the present embodiment when only data insertion in packet units has occurred (when the code error other than data insertion has not occurred) will be explained.

FIGS. 13A to 13K shows only a portion of a frame synchronization code extracted from the received data sequence illustrated in FIG. 6. There are shown in the upper part of the figure a received data sequence FIG. 13A without code error, a received data sequence FIG. 13B in which data loss has occurred in a frame, the first frame position FIG. 13C in the forward direction to the received data sequence FIG. 13B, reference unique words FIG. 13D in the forward direction on time axis, the first checked result FIG. 13E in the forward direction to the received data sequence FIG. 13B, the second frame position FIG. 13F in the backward direction to the received data sequence FIG. 13B, reference unique words FIG. 13G in the backward direction on time axis, and the second checked result FIG. 13H in the backward direction to the received data sequence FIG. 13B. In the example shown in this embodiment, as is evident from the received data sequence FIG. 13B, four bits data (SA, SB, SC, and SD) are inserted between the fourth bit S4 and the fifth bit S5.

When such received data sequence FIG. 13B is input from the input terminal 31, in the first frame synchronization detector 32, a frame code is detected from the received data sequence in the forward direction on time axis to output the first frame position 37, as shown in FIG. 13C. The first frame synchronization code detector 32 has established the synchronization stably using the state transfer of FIG. 3, and in the synchronization established state, the unique word generator inside of the first frame synchronization code detector 32 generates a reference unique word in the forward direction shown in FIG. 13D. The first frame synchronization detector 32 generates a first checked result 40, as shown in FIG. 13E, by checking the reference unique word in the forward direction and the received data sequence. In the example of FIGS. 13A to 13K, data of four bits (SA, SB, SC, and SD) is inserted between the fourth bit S4 and the fifth bit S5, but the code error other than a data insertion has not occurred, so that the first checked result 40 is set "0" correctly until the fourth bit S4. But when SA and S5, SB and S6, SC and S7, SD and S8, and Sj and Sj−4 (9<=j<=N) are in agreement, the first checked result 40 after the fourth bit S4 is set "0", and when in disagreement, it is set "1", so that the bits after the fourth bit S4 are expressed by "?" which indicates indetermination.

Furthermore, the second frame synchronization code detector 33 performs the similar operation as the first frame synchronization code detector 32 described above except detecting the frame synchronization code in the opposite direction. Thereby, there are obtained the second frame position 38, reference unique words in the opposite direction, and the second checked result 41, as shown in FIGS. 13F to 13H. In the example of FIGS. 13A to 13K, the code error other than a data insertion has not occurred, so that while the second checked result 41 from the N-th bit SN to the ninth bit S9 is set "0" correctly, when SA and S1, SB and S2, SC and S3, and SD and S4 are in agreement, the second checked result 41 before the ninth bit S9 is set "0", and when in disagreement, it is set "1", so that the bits before the ninth bit S9 are expressed by "?" which indicates indetermination.

In the difference circuit 44, the difference between the first frame position 37 and the immediately following second frame position 38 is determined to supply it to the data loss and data insertion period judgment circuit 34. In the example of FIGS. 13A to 13K, there is a difference of N+4 bits, so that the data loss and data insertion period judgment circuit 34, at first, judges provisionally that the data loss has occurred. However, this case is applicable to neither of (3) or (4) described above, so that the provisional judgment result is changed with the understanding that the data insertion has occurred. The change process of this provisional judgment will be explained hereinafter in a concrete example.

Because the data (SA, SB, SC, and SD) placed in the bit positions of a unique word for data insertion are unrelated to the unique word, it is rare that SA and S5, SB and S6, SC and S7, and SD and S8 are all in agreement and SA and S1, SB and S2, SC and S3, and SD and S4 are also in agreement. Therefore, it is rare that the first checked result 40 after the data insertion occurrence position and the second checked result 41 before the data insertion occurrence position are both continuously set to "0".

On the other hand, both of the first checked result 40 before the data insertion occurrence position and the second checked result 41 after the data insertion occurrence position are always set to "0", when there is no code error except data insertion. By using such a characteristic, the period in which a data insertion has occurred (data insertion occurrence period) can be presumed according to a boundary point at which two checked results become in disagreement.

The point at which the checked result becomes "1" for the first time in a data insertion occurrence period changes depending on the inserted data and unique word, so that various situations as described below are considered.

A first checked result example (1) shown in FIG. 13I and a second checked result example (1) shown in FIG. 13J are obtained by assuming that S5 is not equal to SA and S4 is not equal to SD, and the length from the first start position (immediately after the fourth bit S4) from which there starts a check disagreement subsequent to a check agreement period longer than a predetermined length viewed the first checked result example (1) in the forward direction on time axis to the second start position (immediately before the fifth bit S5) from which there starts a check disagreement subsequent to a check agreement period longer than a predetermined length viewed the second checked result example (1) in the backward direction on time axis becomes four bits. The four bits agree with a presumed insertion length, so that the provisional judgment is changed such that a data insertion of a presumed insertion length (in this case, four bits) has occurred in the position from SA to SD, that is, in the position (presumed insertion position) from the fifth bit to the eighth bit in the received data sequence of FIG. 13B. Incidentally, the presumed insertion length can be obtained by calculating the difference between the output of the difference circuit 44 (N+4) and the frame length information (N).

In addition, because the presumed insertion length is four bits and the presumed insertion position is the one from SA to SD, as shown in FIG. 13K, the received data sequence with correct length can be reproduced by deleting the data in a period equivalent to four bits of SA to SD. The dummy data insertion and deletion circuit 42 (refer to FIG. 9) performs the process. In the example illustrated in FIGS. 13A to 13K, because the data insertion period agrees with the presumed insertion period completely, the corrected receive data sequence in which not only length but also contents are correct can be obtained by deleting the data.

Next, an example of the present invention according to a different assumption will be explained.

FIGS. 14A to 14H and 14L to 14P shows only a part of the frame synchronization code extracted from the received data sequence illustrated in FIG. 6, and FIGS. 14A to 14H identical with those of FIGS. 13A to 13K are shown in the upper part of FIGS. 14A to 14H and 14L to 14P. However, FIGS. 14M to 14P are shown in the lower part of the figure in place of FIGS. 13I to 13K. A first checked result example (2) of FIG. 14L and a second checked result example (2) of FIG. 14M are obtained by assuming that S5 equals to SA, S6 does not equal to SB, and S4 does not equal to SD, and as will be apparent from the assumption, the first start point is set to a position exceeding the actual data insertion position by one bit. Therefore, in FIG. 14B, the position between the position immediately after the fifth bit SA and the position immediately before the ninth bit S5 is presumed as the presumed insertion position. That is, the presumed data insertion period length becomes three bits which are shorter by one bit than four bits of the presumed insertion length. The synchronization judgment circuit 35 can not determine the actual data insertion occurrence position, so that the ambiguity equivalent to one bit occurs in the presumed insertion position.

In such a case, there is no choice but to finally determine that the data insertion of the insertion presumed length (in this case, four bits) has occurred in any position including from the first start position to the second start position. That is, either of (1) SA to SD or (2) SB to S5 is the correct data insertion period, but the sufficient information to decide either has not been obtained. Here, an example (2) of insertion data deletion which adopts (2) described above is shown in FIG. 14N. In this example (2) of insertion data deletion, as shown by hatching, data SA remains in the position of the fifth bit S5 and, instead, the content of the fifth bit S5 is lost.

As mentioned above, it is assumed that S5 equals to SA in this example, so that the corrected unique word is set to a right result, but an information data peripheral to S5 is resulted in replacement of the inserted data. Thus, when the length from the first start position to the second start position is shorter than a presumed insertion length, a part of the contents of the information data is resulted in incorrect, while the length and unique word of the corrected received data sequence are right.

As previously stated, the position in which the checked result becomes "1" for the first time in a data insertion period changes depending on the inserted data and unique word. When the cross-correlation between the unique word and the inserted data is assumed to be 0, the probability in which the period from the first start position to the second start position agrees with the presumed insertion length will become 25%. In addition, the probability in which the ambiguity of several bits will produce is as follows;

(1) one bit: 25%

(2) two bits: 18.75%

(3) three bits: 12.5%

Therefore, when the ambiguity less than three bits is made permissible, the data presumption period can be presumed with a probability more than 80%.

As with the explanation above, the synchronization judgment circuit 35 corrects the frame synchronization position output. As a result, the frame synchronization position output from the synchronization judgment circuit 35 becomes the position shown in FIG. 14O in Composition 1 and also the position shown in FIG. 14P in Composition 2. This allows the operation to be continued quickly in a following frame. Incidentally, it will be appreciated that the internal state of each frame synchronization code detector may be initialized according to the output result of the synchronization judgment circuit 35.

While the present embodiment has been described, it works effectively when only a usual code error occurs and only when it generates a data loss/insertion in packet units.

F. When a Data Loss Overlaps on a Usual Code Error

There has been described a case in which only a usual code error or only a data loss/insertion in packet units occurs, but in actual application, a different kind of code error often overlaps on a usual one. The operation in such a case will be described with reference to FIGS. 15A to 15L and 15O to 15P and FIGS. 16A to 16L and 16O to 16P.

In the example shown in FIGS. 15A to 15L and 15O to 15P, as with in FIGS. 10A to 10M, a data loss of four bits from the fifth bit S5 to the eighth bit S8 has occurred, and in addition, usual code errors are overlapped at the third bit S3 and the tenth bit S10. Because of those usual code errors, the first checked result and the second checked result become "1" for the first time at the third bit S3 and the tenth bit S10, respectively. Thus, the first start position becomes immediately after the second bit S2 and the second start position becomes immediately before the eleventh bit S11.

When usual code errors are overlapped on a data loss in this way, the data loss corresponds to neither of (3) or (4) and there is a probability that the data loss may be interpreted as data insertion accidentally.

To solve this problem, the following countermeasures are considered;

(5) the embodiment is not applied to a data insertion, (6) a data loss and data insertion are distinguished by adding a frame number to a frame synchronization code, (7) data loss and data insertion are distinguished by adding limitation to a length of data loss/insertion.

The countermeasure (5) functions only when a usual code error has overlapped on a data loss. When it is taken into account that cell loss in ATM transmission and packet loss on an Internet are both data loss phenomena and the occurrence probability of data loss is substantially higher than that of data insertion in a multimedia multiplexing, considering that if this embodiment functions effectively only when a usual code error overlaps on a data loss, sufficiently high practicality can be obtained.

Here, the operation adopting countermeasure (5) will be explained with reference to FIGS. 15A to 15L and 15O to 15P.

In the example shown in FIGS. 15A to 15L and 15O to 15P, the first start position is prior to the second start position on time axis, so that it is recognized that a data loss may occur somewhere in this period, but a data loss occurrence position can not be specified. Alternatively, the data loss occurrence position is assumed to insert dummy data into the position. However, in the example (1) of dummy data insertion shown in FIG. 15K, dummy data are inserted into the period between the fifth bit S5 and the eighth bit S8 based on the assumption that a data loss has occurred immediately after the fourth bit S4. This dummy data insertion position is advantageously the right position.

On the other hand, the example (2) of dummy data insertion shown in FIG. 15L assumes that a data loss has occurred immediately after the sixth bit S6, and inserts a dummy data into the period from the seventh bit S7 to the tenth bit S10 by mistake. When usual code errors overlap on a data loss in this way, some errors may occur, but there are maintained the advantages that a frame synchronization can be retained stably and a corrected received data with right length can be obtained.

Moreover, the countermeasure (6) can distinguish a data loss and data insertion by using a frame number. Thus, it functions effectively to both cases in which a usual code error and data loss overlap and a usual code error and data insertion is overlap. In practice, many multimedia applications add the frame number, so that this countermeasure can often be adopted without causing data redundancy. The operation applying this countermeasure will be described hereinafter.

In the example shown in FIGS. 15A to 15L and 15O to 15P, a frame number corresponding to a second frame position immediately after a first frame position is larger by one than a frame number corresponding to the first frame position in the left of the figure. This means that the second frame position is acquired prior to the first frame position for the same frame, that is, a data loss has occurred in the frame concerned. Thus, although the first start position is prior to the second start position on time axis, it can be determined that not data insertion but data loss has occurred.

On the other hand, in the example shown in FIGS. 16A to 16L and 16O to 16P (example of data insertion), a frame number corresponding to a first frame position and a frame number corresponding to its immediately following second frame position are in agreement. This means that the first frame position is acquired prior to the second frame position for the same frame, that is, a data insertion has occurred in the frame concerned. Thus, it can be determined that not data but data insertion has occurred.

Furthermore, when a packet length is sufficiently smaller than a frame length, a data loss/data insertion can be distinguished by adding limitation to a presumed loss length and presumed insertion length (countermeasure (7)). For example, when a permissible presumed loss length (a first threshold value) and a permissible presumed insertion length (a second threshold value) are both set to a half of the frame length, an effect equivalent to the countermeasure (6) can be obtained.

Incidentally, the concrete insertion method of the dummy data in countermeasure (6) and (7) is similar to the method in the countermeasure (5) described above.

G. When Data Insertion Overlaps on Usual Code Error

Next, the processing when a data insertion overlaps on a usual code error will be described with reference to FIGS. 16A to 16L and 16O to 16P. Incidentally, in FIGS. 16A to 16L and 16O to 16P, as for the data insertion phenomenon, it is assumed that a data insertion of four bits will occur between the fourth bit S4 and the fifth bit S5 and also usual code errors will generate in the third bit S3 and the fifth bit S5.

As is evident from FIGS. 16A to 16L and 16O to 16P, the length of presumed data insertion period is seven bits, longer by three bits than the actual length (in this case, four bits) according to the code error. It is recognized that a data insertion may occur somewhere in this period, but a data insertion occurrence position can not be specified. Accordingly, the data insertion occurrence position should be assumed to delete data. In the example (1) of inserted data deletion shown in FIG. 16K, the data in the period from the fifth bit to the eighth bit (SA to SD) are deleted. This is the accidental data deletion in the right period.

On the other hand, in the example (2) of insertion data deletion shown in FIG. 16L, it is assumed that a data insertion has occurred, so that data of the period from the third bit S3 to the sixth bit S6 are deleted. As a result, in the example (2) of insertion data deletion, the third bit S3 and the fourth bit S4 corresponding to the correct data are deleted, while, the inserted data SC and SD remain. When a usual code error overlaps on a data insertion in this way, some of errors may occur, but there are maintained the advantages that a frame synchronization can be retained stably and a corrected received data with correct length can be obtained.

H. In a Case of Variable Length Frame

Figure 18:
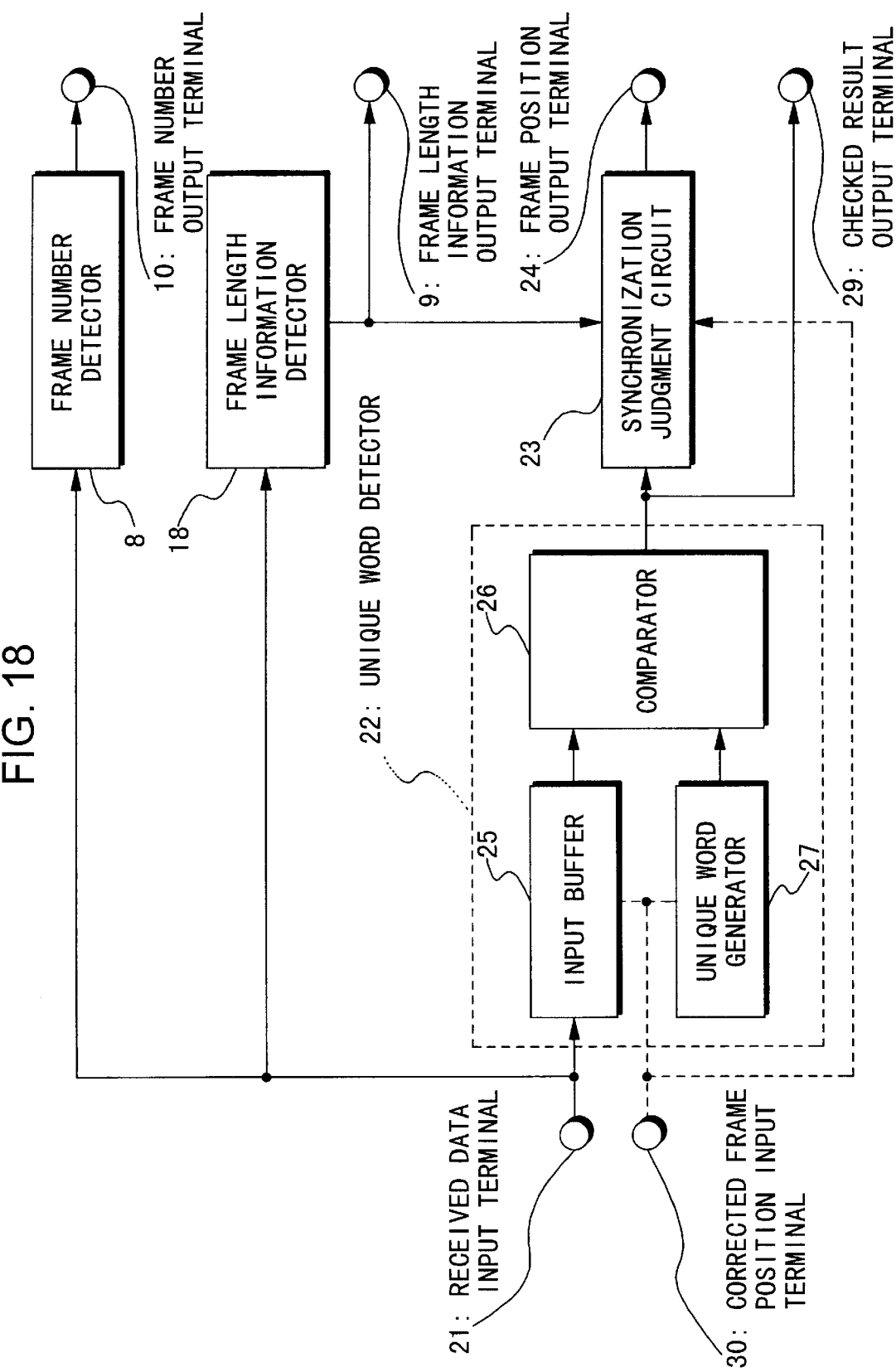
FIG. 18 is a block diagram showing a composition when a frame synchronization code detector according to an embodiment of the present invention is applied to a variable length frame.

Incidentally, a fixed length frame is presupposed to be used in the above, but when frame length information is included in a frame synchronization code, the present invention can be operated as described above, even when a variable length frame is used. In this case, a frame synchronization code detector shown in FIG. 18 may be used. The frame synchronization code detector shown in FIG. 18 is provided with a frame length information detector 18 which; detects the frame length information in the received data sequence from the received data input terminal 21, supplies the frame length information detected to a synchronization judgment circuit 23, and outputs it through a frame length information output terminal 9. The symbol 8 in FIG. 18 designates a frame number detector, which detects a frame number in the received data sequence from the received data input terminal 21 and outputs it through a frame number output terminal 10.

Figure 17:
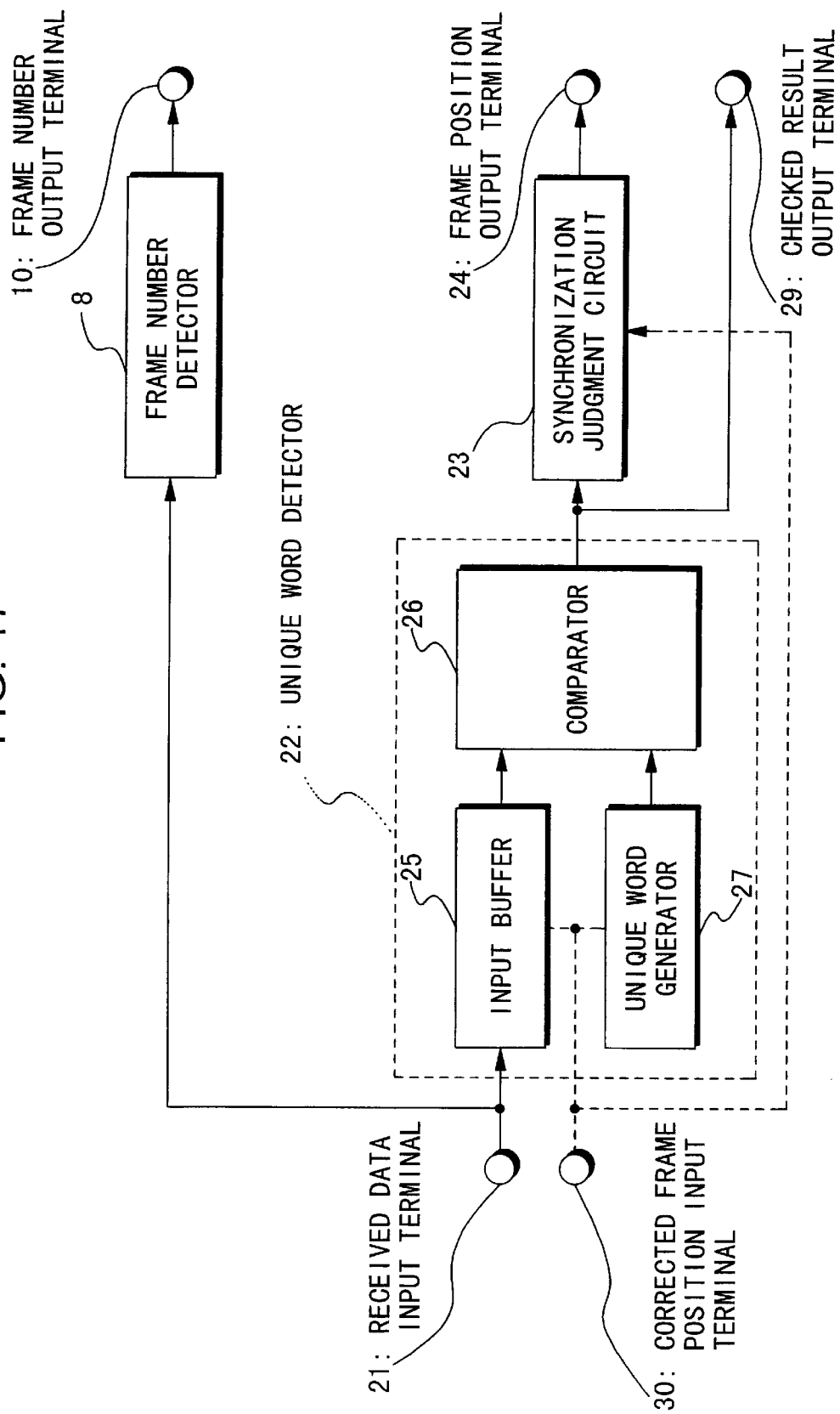
FIG. 17 is a block diagram showing a composition when a frame synchronization code detector according to an embodiment of the present invention is applied to a variable length frame.

Furthermore, even when the frame length information is not included in the received data sequence, when a unique word which can be detected in the opposite direction on time axis is set up appropriately, the operation like the embodiment described above can be achieved. There is shown a composition of the frame synchronization code detector in this case in FIG. 17.

In addition, when there is used a pseudo fixed length frame with a pointer indicating the head position of the information data in a portion of the frame synchronization code with fixed length frame composition to the information data of the variable length frame composition, the operation as in the embodiment described above can be achieved without modification.

I. When Data Loss/insertion Occur in a General Length

In the description above, it is assumed that the data loss/insertion occurs in multiples of the arrangement interval of a unique word, but the present embodiment operation normally even without such as assumption. The present embodiment detects the position and length (period) of the data loss/insertion by determining the frame position in the forward and backward direction on time axis and also by checking the reference unique word and the received data sequence. In the above mentioned checking process, even when a checking object following the position at which the data loss/insertion has occurred is not a unique word but information data, a check disagreement may occur as well, so that the present embodiment operates normally even when the data loss/insertion does not occur in multiples of the arrangement interval of the unique word.

Figure 19:
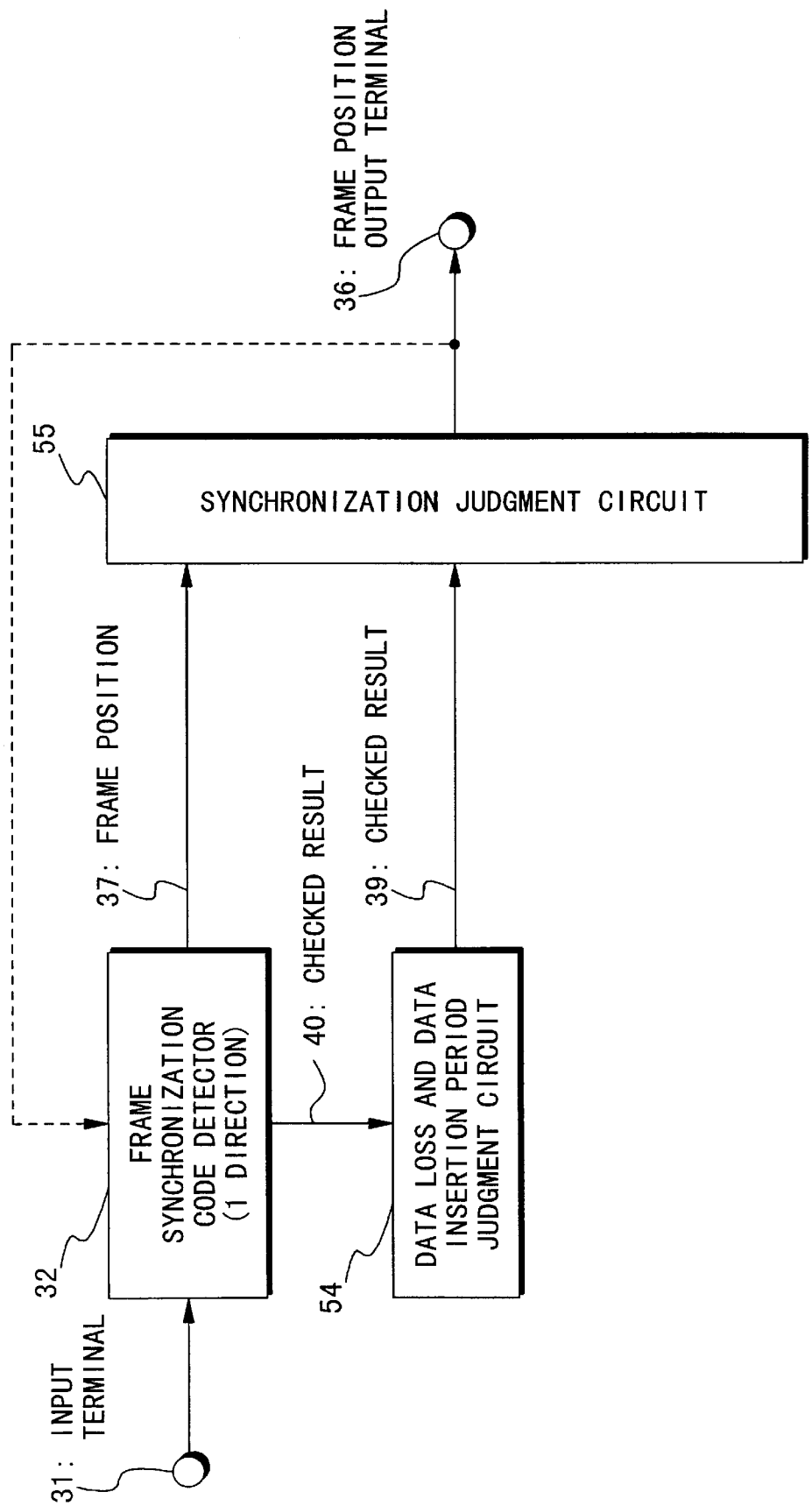
FIG. 19 is a block diagram showing the composition of the frame synchronization circuit according to another embodiment of the present invention.

FIG. 19 is a block diagram showing the composition of the frame synchronization circuit according to another embodiment of the invention. When comparing this composition with the one shown in FIG. 8, the second frame synchronization code detector 33 and the difference circuit 44 are removed, a data loss and data insertion period judgment circuit 54 is provided in place of the data loss and data insertion period judgment circuit 34, and a synchronization judgment circuit 55 is provided in place of the synchronization judgment circuit 35.

The data loss and data insertion period judgment circuit 54 accumulates evaluation values of the checked result 40 and judges whether a data loss or data insertion has occurred based on whether the accumulation result exceeds the predetermined threshold value. For example, the evaluation value for "0" (agreement) of the checked result 40 can be set as "−1" and for "1" (disagreement) as "+2", and the predetermined threshold value can be set as "5". However, the accumulation result does not become less than "0".

Next, there will be explained the operation of this embodiment when a code error occurs with reference to FIGS. 20A to 20G. The frame synchronization code detector 32, as with the first embodiment, checks the reference unique word and received data sequence in the forward direction to output the checked result 40, as shown in FIG. 20E. Incidentally, the contents of FIGS. 20A to 20E are similar to those of FIGS. 7A to 7E.

The evaluation values corresponding to the checked result 40 are accumulated in the data loss and data insertion period judgment circuit 54. The checked result 40 remain at "0" until the third bit S3 in FIGS. 20A to 20G, so that the evaluation value is "−1" and the accumulation result remains at "0". This is because the accumulation result never becomes less than "0" as described above.

When the checked result 40 becomes "1" at the fourth bit S4, the evaluation value becomes "2" and the accumulation result also becomes "2". Next, when the checked result 40 becomes "0" at the fifth bit S5, the evaluation value becomes "2" and the accumulation result becomes "1". Next, when the checked result 40 becomes "1" at the sixth bit S6, then the evaluation value becomes "2" and the accumulation result becomes "3". The checked result 40 remains at "0" continuously from the seventh bit S7, so that the accumulation result is decremented by "1" and returns to "0" at the ninth bit S9. In the example described above, because the accumulation result never exceeds the threshold value "5", the judgment result of FIG. 20G always keeps "0".

Figures 21A, 21B, 21C, 21D:

Next, there will be explained the operation when a data loss has occurred in the present embodiment with reference to FIGS. 21A to 21H. FIG. 21A shows a received data sequence without code error, and FIG. 21B shows a received data sequence in which a data loss has occurred in a frame. FIG. 21E shows both checked results. In FIG. 21E, the checked results from the first bit S1 to the fourth bit S4 are "0". The checked results after the fifth bit S5 become random values corresponding to the contents of the data sequence.

One example of the random checked results are shown in FIG. 21F. Also, the accumulation result of evaluation value to the checked result is shown in FIG. 21G. When a data loss has occurred, the checked result 40 never returns to continuous "0", so that the accumulation result exceeds a threshold value at a certain point, and the judgment result shown in FIG. 21H becomes "0". When the judgment result is transmitted to the synchronization judgment circuit 55, there is detected "synchronous error" caused by data loss.

According to the detected result, the synchronization judgment circuit 55 stops the output of the frame position, and outputs an instruction to the frame synchronization code detector 32 to make a detection the unique word once again.

Furthermore, even when a data insertion has occurred in the present embodiment, the phenomenon completely similar to that described above may occur. Thus, the judgment result becomes "1" as in the case when the data loss has occurred, so that the output of the frame position may be stopped to detect the unique word once again.

It is preferred that the threshold value in the present embodiment be set to a value which can detect a slightly longer error than an assumed one generally occurring in a transmission channel. However, even when the threshold value is set in this manner, when an error occurs over a longer interval than assumed, the judgment result turns to "1" even though a data loss or data insertion has not occurred. In such a case, the occurrence of such phenomenon means that the state of the transmission channel is substantially deteriorated, so that even though a frame synchronization is retained, to obtain a correct received data can not be expected. Therefore, it is considered that a practical problem may not occur according to the judgment result of "1" in such a state.

What is claimed is:

1. A frame synchronization circuit used on a reception side of a data transmission system utilizing a frame composition in which a frame synchronization code is scatteredly positioned in a frame, said frame synchronization circuit comprising:
    a first frame synchronization code detector that: 1) detects said frame synchronization code from a received data sequence, 2) compares said frame synchronization code with a correct frame synchronization code in a forward direction on a time axis and 3) outputs a first checked result in bit form, each bit of said first checked result indicating whether a bit of said frame synchronization code has a same value of a corresponding bit of said correct frame synchronization code, and 4) outputs a prescribed bit position in said frame synchronization code as a first frame position;
    a second frame synchronization code detector that: 1) detects said frame synchronize on code from said received data sequence, 2) compares said frame synchronization code detected by said second frame synchronization code detector with said correct frame synchronization code in a backward direction on said time axis and 3) outputs a second checked result in bit form, each bit of said second checked result indicating whether a bit of said flame synchronization code detected by said second frame synchronization code detector has a same value of a corresponding bit of said correct frame synchronization code, and 4) outputs a prescribed bit position in said frame synchronization code detected by said second frame synchronization code detector as a second frame position;
    a difference circuit for obtaining a length between said first frame position and said immediately following second frame position;
    a data loss and data insertion pectic judgment circuit determining a data loss period and a data insertion period in said received data sequence according to said length output from said difference circuit said first checked result and said second checked result; and
    a synchronization judgement circuit determining and outputting a frame synchronization position depending on said first frame position, said second frame position, and a determination of said data loss and data insertion period judgment circuit.

2. A frame synchronization circuit according to claim 1 further comprising:
    a dummy data insertion and deletion circuit inserting dummy data to said data loss period and deleting data from said data insertion period for said received data sequence to output as a corrected received data sequence.

3. A frame synchronization circuit according to claim 1 wherein:
    said first frame synchronization code detector and said second frame synchronization code detector use said frame synchronization position output from said synchronization judgment circuit as an initial value, when at least one of said data loss period and said data insertion period is determined by said data loss and data insertion period judgment circuit.

4. A frame synchronization circuit according to claim 2 wherein:
    said first frame synchronization code detector and said second frame synchronization code detector use said frame synchronization position output from said synchronization judgment circuit as an initial value, when at least one of said data loss period and said data insertion period is determined by said data loss and data insertion period judgment circuit.

5. A frame synchronization circuit according to claim 1 wherein:
    said data loss and data insertion period judgment circuit:
        provisionally determines that a data loss has occurred in said frame when frame length information of a frame to be processed is different from said length output from said difference circuit;
    finally determines that a data loss of a number of bits corresponding to a difference between said frame length information of a flame to be processed and a length output from said difference circuit has occurred at the position when a first start position, from which a check disagreement starts, followed by a continuous check agreement period obtained from said first checked result viewed in the forward direction on a time axis and is longer than a predetermined length agrees with a second start position, from which a check agreement starts, followed by a continuous check agreement period obtained from said second checked result viewed in the backward direction on the time axis and is longer than the predetermined length;
    finally determines that a data loss of said number of bits has occurred in any position in a period from said second start position to said first start position when said second start position is prior to said first start position on said time axis;
    finally determines a period from said first start position to said second start position to be a data insertion period when a length of said period from said first start position to said second start position agrees with said length output from said difference circuit; and
    finally determining a period of said number of bits including said period from said first start position to said second start position to be a data insertion period when said length of said period from said first start position to said second start position is shorter than said length output from said difference circuit.

6. A frame synchronization circuit according claim 1 wherein: said data loss and data insertion period judgment circuit:
    provisionally determines that a data loss has occurred in said frame when frame length information of a frame to be processed is different from said length output from said difference circuit;
    finally determines that a data loss of a number of bits corresponding to a difference between said frame length information of a frame to be processed and said length output from said difference circuit has occurred at a first start position when said first start position agrees with a second start position, said first start position being a position wherein, when viewing said first checked result in said forward direction on said time axis, a check disagreement starts after a continuous check agreement period which is longer than a predetermined length, and said second start position being a position wherein, when viewing said checked result in said backward direction on said time axis, a check disagreement starts after a continuous check agreement period which is longer than said predetermined length;

finally determines that a data loss of said number of bits has occurred in any position in a period from said second start position to said first start position when said second start position is prior to said first start position on said time axis; and finally determines that a data loss of said number of bits has occurred in any position in a period from said first start position to said second start position when said first start position is prior to said second start position on said time axis.

A frame synchronization circuit used on a reception side of a data transmission system utilizing a frame composition in which a frame synchronization code is scatteredly positioned in a frame, said frame synchronization circuit comprising:

a frame synchronization code detector detecting said frame synchronization code from a received data sequence, outputting a frame position, and outputting a checked result by checking said frame synchronization code detected and a correct frame synchronization code, wherein said frame synchronization code detector comprising:

a first frame synchronization code detector detecting said frame synchronization code by checking with said correct frame synchronization code in a forward direction on a time axis for a received data sequence, outputting a detected position as a first frame position and outputting the checked result as a first checked result;

a second frame synchronization code detector detecting said frame synchronization code by checking with said correct frame synchronization code in a backward direction on said time axis for said received data sequence, outputting a detected position as a second frame position and outputting said checked result as a second checked result;

wherein said data loss and data insertion period judgment circuit comprises:

a difference circuit detecting a length from said first frame position to said immediately following second frame position;

a frame length information output that outputs frame length information;

said data loss and data insertion period judgment circuit presuming a data loss period or a data insertion period depending on said frame length information, a length output from said difference circuit, said first checked result, and said second checked result; and a synchronization judgment circuit determining and outputting a frame synchronization position depending on said first frame position, said second frame position, and a determination of said data loss and data insertion period judgment circuit wherein:
said frame includes a frame number;
said frame synchronization circuit is used on a reception side of data transmission system in which a frame number is enabled to be detected on said reception side;

wherein said data loss and data insertion period judgment circuit:

provisionally determines that a data loss has occurred in said frame when frame length information of a frame to be processed is different from said length output from said difference circuit;

executing a first final judgment when a first start position, from which a first check disagreement starts, followed by a continuous check agreement period which can be obtained from said first checked result viewed in said forward direction on said time axis and is longer than a predetermined length agrees with a second start position, from which a second check disagreement starts, followed by a continuous check agreement period which can be obtained from said second checked result viewed in said backward direction on said time axis and is longer than a predetermined length, said first final judgment being that a data loss of a number of bits corresponding to a difference between said frame length information of a frame to be processed and said length output from said difference circuit has occurred at said first position;

executing a second final judgment when said second start position is prior to said first start position on said time axis, said second final judgment being that a data loss of said number of bits has occurred in any position in a period from said second start position to said fist start position;

executing a third final judgment when said first start position is prior to said second start position on said time axis and a first frame number indicated by said first frame position and a second frame number indicated by said immediately following second frame position are continuous, said third final judgment being that a data loss of said number of bits has occurred in any position in said period from said first start position to said second start position;

said provisionally determining being changed from data loss to data insertion where at least one of said first, said second and said third final judgments are not applicable;

finally determining a period from said first start position to said second start position to be a data insertion period when a length of said period from said first start position to said second start position agrees with said length output from said different circuit;

finally determining a period of said number of bits including said period from said first start position to said second start position to be a data insertion period when said length of said period from said first start position to said second start position is shorter than said length output from said difference circuit; and finally determining that a data insertion of said number of bits has occurred in any position in said period from said first start position to said second start position when said length of said period from said first start position to said second start position is longer than said length output from said difference circuit.

7. A frame synchronization circuit used on a reception side of a data transmission system utilizing a frame composition in which a frame synchronization code is scatteredly positioned in a frame, said frame synchronization circuit comprising:

a frame synchronization code detector detecting said frame synchronization code from a received data sequence, outputting a frame position, and outputting a checked result by checking said frame synchronization code detected and a correct frame synchronization code, when said frame synchronization code detector comprising:

a first frame synchronization code detector detecting said frame synchronization code by checking with said correct frame synchronization code in a forward direction on a time axis for a received data sequence, outputting a detected position as a first frame position and outputting the checked result as a first checked result;

a second frame synchronization code detector detecting said frame synchronization code by checking with said correct frame synchronization code in a backward direction on said time axis for said received data sequence, outputting a detected position as a second frame position and outputting said checked result as a second checked result;

wherein said data loss and data insertion period judgment circuit comprises:

a difference circuit detecting a length from said first frame position to said immediately following second frame position;

a frame length information output that outputs frame length information;

said data loss and data insertion period judgment circuit presuming a data loss period or a data insertion period depending on said frame length information, a length output from said difference circuit, said first checked result, and said second checked result; and a synchronization judgment circuit determining and outputting a frame synchronization position depending on said first frame position, said second frame position, and a determination of said data loss and data insertion period judgment circuit;

wherein:

said data loss and data insertion period judgment circuit:

provisionally determines that a data loss has occurred in said frame when said frame length information of frame to be processed is different from said length output from said difference circuit and a difference of both is smaller than a predetermined first threshold value;

finally determining that a data loss of a number of bits corresponding to a difference between frame length information of a frame to be processed and said length output from said difference circuit has occurred at a first start position when said first start position, from which a check disagreement starts, followed by a continuous check agreement period which can be obtained from said first checked result viewed in said forward direction on said time axis and is longer than a predetermined length agrees with a second start position, from which a checked disagreement starts, followed by a continuous check agreement period which can be obtained from said second checked result viewed in said backward direction on said time axis and is longer than said predetermined length;

finally determining that a data loss of said number of bits has occurred in any position in a period from said second start position to said first start position when said second start position is prior to said first start position on said time axis;

finally determining that a data loss of said number of bits has occurred in any position in a period from said first start position to said second start position when said first start position is prior to said second start position on said time axis;

provisionally determining that a data insertion has occurred in said frame when said frame length information of said frame and said length output from said difference circuit are different and said length output from said difference circuit is smaller than a predetermined second threshold value;

finally determining said period from said first start position to said second start position to be a data insertion period when a length of said period from said first start position to said second start position agrees with said length output from said difference circuit;

finally determining a period of said number of bits including said period from said first start position to said second start position to be a data insertion period when said length of said period from said first start position to said second start position is shorter than said length output from said difference circuit; and finally determining that a data insertion of said number of bits has occurred in any position in said period from said first start position to said second start position when said length of said period from said first start position to said second start position is longer than said length output from said difference circuit.

8. A frame synchronization circuit used on a reception side of a data transmission system utilizing a frame composition in which a frame synchronization code is scatteredly positioned in a frame, said frame synchronization circuit comprising:

a frame synchronization code detector detecting said frame synchronization code from a received data sequence, outputting a frame position, and outputting a checked result by checking said frame synchronization code detected and a correct frame synchronization code, when said frame synchronization code detector comprising:

a first frame synchronization code detector detecting said frame synchronization code by checking with said correct frame synchronization code in a forward direction on a time axis for a received data sequence, outputting a detected position as a first frame position and outputting the checked result as a first checked result;

a second frame synchronization code detector detecting said frame synchronization code by checking with said correct frame synchronization code in a backward direction on said time axis for said received data sequence, outputting a detected position as a second frame position and outputting said checked result as a second checked result;

wherein said data loss and data insertion period judgment circuit comprises:

a difference circuit detecting a length from said first frame position to said immediately following second frame position;

a frame length information output that outputs frame length information;

said data loss and data insertion period judgment circuit presuming a data loss period or a data insertion period depending on said frame length information, a length output from said difference circuit, said first checked result, and said second checked result; and a synchronization judgment circuit determining and outputting a frame synchronization position depending on said first frame position, said second frame position, and a determination of said data loss and data insertion period judgment circuit;

wherein:

said data loss and data insertion period judgment circuit:

provisionally determines that a data loss has occurred in said frame when said frame length information of frame to be processed is different from said length output from said difference circuit and a difference of both is smaller than a predetermined first threshold value;

finally determining that a data loss of a number of bits corresponding to a difference between frame length information of a frame to be processed and said length output from said difference circuit has occurred at a first start position when said first start position, from which a check disagreement starts, followed by a continuous check agreement period which can be obtained from said first checked result viewed in said forward direction on said time axis and is longer than a predetermined length agrees with a second start position, from which a checked disagreement starts, followed by a continuous check agreement period which can be obtained from said second checked result viewed in said backward direction on said time axis and is longer than said predetermined length;

finally determining that a data loss of said number of bits has occurred in any position in a period from said second start position to said first start position when said second start position is prior to said first start position on said time axis;

finally determining that a data loss of said number of bits has occurred in any position in a period from said first start position to said second start position when said first start position is prior to said second start position on said time axis;

provisionally determining that a data insertion has occurred in said frame when said frame length information of said frame and said length output from said difference circuit are different and said length output from said difference circuit is smaller than a predetermined second threshold value;

finally determining said period from said first start position to said second start position to be a data insertion period when a length of said period from said first start position to said second start position agrees with said length output from said difference circuit;

finally determining a period of said number of bits including said period from said first start position to said second start position to be a data insertion period when said length of said period from said first start position to said second start position is shorter than said length output from said difference circuit; and finally determining that a data insertion of said number of bits has occurred in any position in said period from said first start position to said second start position when said length of said period from said first start position to said second start position is longer than said length output from said difference circuit.

9. A frame synchronization circuit used on a reception side of a data transmission utilizing a frame composition in which a frame synchronization code is scatteredly positioned in a frame, the frame synchronization circuit comprising:

a frame synchronization code detector that: 1) detects the frame synchronization code from a received data sequence, 2) compares the frame synchronization code with a correct frame synchronization code, 3) outputs a checked result in bit form, each bit of the checked result indicating whether a bit of the frame synchronization code has a same value of a corresponding bit of the correct frame synchronization code, and 4) outputs a prescribed bit position in the frame synchronization code as a first frame position;

a data loss and data insertion pedod judgment circuit for accumulating an evaluation value of said checked result and for determining whether a data loss or data insertion has occurred in said received data sequence according to said accumulated result; and a synchronization judgment circuit determining and outputting a frame synchronization position according to said frame position and a presumed result of said data loss and data insertion period judgment circuit, wherein said data loss and data insertion period judgment circuit accumulating an evaluation value of said checked result and judging whether data loss or data insertion has occurred according to the accumulated result.

10. A frame synchronization circuit according to claim 1, further comprising:

a frame length information output means for obtaining a frame length information from a frame and for outputting the frame length information, wherein the data loss and data insertion period judgment circuit uses said frame length information to determine the data loss period and the data insertion period in said received data sequence.

11. A frame synchronization circuit according to claim 1 wherein:

said frame includes a frame number;

said frame synchronization circuit is used on a reception side of a data transmission system in which a frame number is enabled to be detected on said reception side; wherein said data loss and data insertion period judgment circuit:

provisionally determines that a data loss has occurred in said frame when frame length information of a frame to be processed is different from said length output from said difference circuit;

executing a first final judgment that a data loss of a number of bits corresponding to a difference between said frame length information of a frame to be processed and said length output from said difference circuit has occurred at a first start position when said first start position agrees with a second start position, said first start position being a position where, when viewing said first checked result in said forward direction on said time axis, a check disagreement starts after a continuous check agreement period which is longer than a predetermined length, and said second start position being a position where, when viewing said checked result in said backward direction on said time axis, a check disagreement starts after a continuous check agreement period which is longer than said predetermined length;

executing a second final judgment when said second start position is prior to said first start position on said time axis, said second final judgment being that a data loss of said number of bits has occurred in any position in a period from said second start position to said first start position;

executing a third final judgment when said first start position is prior to said second start position on said time axis and a first frame number indicated by said first frame position and a second frame number indicated by said immediately following second frame position are continuous, said third final judgment being that a data loss of said number of bits has occurred in any position in any said position in said period from first start position to said second start position;

said provisionally determining being changed from data loss to data insertion where at least one of said first, said second and said third final judgments are not applicable;

finally determining a period from said first start position to said second start position to be a data insertion period when a length of said period from said first start position to said second start at position agrees with said length output from said difference circuit;

finally determining a period of said number of bits including said period from said first start position to said second start position to be a data insertion period when said length of said period from said first start position to said second start position is shorter than said length output from said difference circuit; and finally determining that a data insertion of said number of bits has occurred in any position in said period from said first start position to said second start position when said length of said period from said first start position to said second start position is longer than said length output from said difference circuit.

12. A frame synchronization circuit according to claim 1, wherein:

said data loss and data insertion period judgment circuit:

provisionally determines that a data loss has occurred in said frame when said frame length information of a frame to be processed is different from said length output from said difference circuit and a difference of both is smaller that a predetermined first threshold value;

finally determining that a data loss of a number of bits corresponding to a difference between frame length information of a frame to be processed and said length output from said difference circuit has occurred at a first start position when said first start position agrees with a second start position, said first start position being a position where, when viewing said first checked result in said forward direction on said time axis, a check disagreement starts after a continuous check agreement period which is longer than a predetermined length, and said second start position being a position where, when viewing said checked result in said backward direction on said time axis, a check disagreement starts after a continuous check agreement period which is longer than said predetermined length;

finally determining that a data loss of said number of bits has occurred in any position in a period from said second start position to said first start position when said second start position is prior to said first start position on said time axis;

finally determining that a data loss of said number of bits has occurred in any position in said period from said first start position to said second start position when said first start position is prior to said second at position on said time axis;

provisionally determining that a data insertion has occurred in said frame when said frame length information of said frame and said length output from said difference circuit are different and said length output from said difference circuit is smsflu than a predetermined second threshold value;

finally determining said period from said first start position to said second start position to be a data insertion period when a length of said period from said first start position to said second start position agrees with said length output from said difference circuit;

finally determining a period of said number of bits including said period from said first start position to said second start position to be a data insertion period when said length of said period from said first start position to said second start position is shorter than said length output from said difference circuit; and finally determining that a data insertion of said number of bits has occurred in any position in said period from said first start position to said second start position when said length of said period from said first start position to said second start position is longer than said length output from said difference circuit.

* * * * *

UNITED STATES PATENT AND TRADEMARK OFFICE
CERTIFICATE OF CORRECTION

PATENT NO. : 6,738,393 B2
DATED : May 18, 2004
INVENTOR(S) : Toshio Miki et al.

It is certified that error appears in the above-identified patent and that said Letters Patent is hereby corrected as shown below:

Column 2,
Item [57], ABSTRACT
Line 13, delete "which presumes".

Column 23,
Line 34, delete "synchronize on code" and substitute -- synchronization code -- in its place.
Line 41, delete "flame" and substitute -- frame -- in its place.
Line 51, delete "pectic" and substitute -- period -- in its place.
Line 54, immediately after "difference circuit" insert -- , -- (comma).
Line 55, immediately after the first occurrence of "checked result" insert -- , -- (comma).

Column 24,
Line 29, delete "flame" and substitute -- frame -- in its place.

Column 25,
Lines 3 and 8, delete "wherein," and substitute -- where, -- in its place.
Line 58, immediately after "judgment circuit", insert -- ; -- (semicolon).

Column 25, line 23 thru Column 26, line 65,
should be renumbered as claim 7, starting with "A frame synchronization" and ending with "said difference circuit.".

Column 26,
Line 66, renumber claim 7 as claim 8.

Column 27,
Line 9, after "code," delete "when" and substitute -- wherein -- in its place.

Column 28, lines 32-67 and Column 29, lines 1-65,
Delete claim 8 in its entirety.

Column 30,
Line 14, after "insertion" delete "pedod" and substitute -- period -- in its place.

UNITED STATES PATENT AND TRADEMARK OFFICE
CERTIFICATE OF CORRECTION

PATENT NO. : 6,738,393 B2
DATED : May 18, 2004
INVENTOR(S) : Toshio Miki et al.

It is certified that error appears in the above-identified patent and that said Letters Patent is hereby corrected as shown below:

<u>Column 32,</u>
Line 28, after "circuit is" delete "smsflu" and substitute -- smaller -- in its place.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,738,393 B2
DATED          : May 18, 2004
INVENTOR(S)    : Toshio Miki et al.

It is certified that error appears in the above-identified patent and that said Letters Patent is hereby corrected as shown below:

Title page,
Item [73], Assignee, after "Communications," insert -- Network, Inc., --.
Item [57], ABSTRACT
Line 13, delete "which presumes".

Column 23,
Line 34, delete "synchronize on code" and substitute -- synchronization code -- in its place.
Line 41, delete "flame" and substitute -- frame -- in its place.
Line 51, delete "pectic" and substitute -- period -- in its place.
Line 54, immediately after "difference circuit" insert -- , -- (comma).
Line 55, immediately after the first occurrence of "checked result" insert -- , -- (comma).

Column 24,
Line 29, delete "flame" and substitute -- frame -- in its place.

Column 25,
Lines 3 and 8, delete "wherein," and substitute -- where, -- in its place.
Line 67, immediately after "judgment circuit", insert -- ; -- (semicolon).

Column 25, line 23 thru Column 26, line 65,
should be renumbered as claim 7, starting with "A frame synchronization" and ending with "said difference circuit.".

Column 26,
Line 66, renumber claim 7 as claim 8.

Column 27,
Line 9, after "code," delete "when" and substitute -- wherein -- in its place.

Column 28, lines 32-67 thru Column 29, lines 1-65,
Delete claim 8 in its entirety.

Column 30,
Line 14, after "insertion" delete "pedod" and substitute -- period -- in its place.

UNITED STATES PATENT AND TRADEMARK OFFICE
CERTIFICATE OF CORRECTION

PATENT NO. : 6,738,393 B2
DATED : May 18, 2004
INVENTOR(S) : Toshio Miki et al.

It is certified that error appears in the above-identified patent and that said Letters Patent is hereby corrected as shown below:

Column 32,
Line 28, after "circuit is" delete "smsflu" and substitute -- smaller -- in its place.

Signed and Sealed this

Seventh Day of December, 2004

JON W. DUDAS
*Director of the United States Patent and Trademark Office*